(12) United States Patent
Kim et al.

(10) Patent No.: US 12,307,064 B2
(45) Date of Patent: May 20, 2025

(54) ELECTRONIC DEVICE COMPRISING EXPANDABLE DISPLAY, AND METHOD FOR PROVIDING CONTENT OF ELECTRONIC DEVICE

(71) Applicant: Samsung Electronics Co., Ltd., Suwon-si (KR)

(72) Inventors: Juyeoung Kim, Suwon-si (KR); Joseph Kim, Suwon-si (KR); Jungwon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/444,044

(22) Filed: Feb. 16, 2024

(65) Prior Publication Data

US 2024/0231557 A1    Jul. 11, 2024

Related U.S. Application Data

(63) Continuation of application No. 18/308,289, filed on Apr. 27, 2023, now Pat. No. 11,907,494, which is a
(Continued)

(30) Foreign Application Priority Data

Dec. 3, 2020 (KR) .................. 10-2020-0167862
Jan. 6, 2021 (KR) .................. 10-2021-0001549

(51) Int. Cl.
*G06F 3/0481* (2022.01)
*G06F 1/16* (2006.01)
(Continued)

(52) U.S. Cl.
CPC .......... *G06F 3/0481* (2013.01); *G06F 1/1624* (2013.01); *H04M 1/0235* (2013.01); *G06F 3/1431* (2013.01); *G06F 2203/04803* (2013.01)

(58) Field of Classification Search
CPC .... G06F 3/0481; G06F 1/1624; G06F 3/1431; G06F 2203/04803; H04M 1/0235
See application file for complete search history.

(56) References Cited

U.S. PATENT DOCUMENTS 10,042,595 B2   8/2018   Behzadi et al.
10,067,641 B2   9/2018   Kim et al.
(Continued)

FOREIGN PATENT DOCUMENTS

KR   10-2015-0094484 A   8/2015
KR   10-2015-0099297 A   8/2015
(Continued)

OTHER PUBLICATIONS

International Search Report dated Feb. 10, 2022, issued in International Application No. PCT/KR2021/015527.

*Primary Examiner* — Asher D Kells
(74) *Attorney, Agent, or Firm* — Jefferson IP Law, LLP

(57) ABSTRACT

An electronic device is provided. The electronic device includes a display including a main display area and at least one expansion display area expandable from the main display area, a communication module, and a processor, wherein the processor is configured to execute an application of the electronic device in a first state in which the display is not expanded or in a second state in which the display is expanded, display first content on the display, establish a connection with an external device, receive a context generated from the external device, when the context is received, determine a position to display second content related to the context, from among the main display area or the at least one expansion display area, based on a type of the first content and whether the display is in the first state or the second state, and display the second content at the determined position.

10 Claims, 22 Drawing Sheets

Related U.S. Application Data continuation of application No. PCT/KR2021/015527, filed on Nov. 1, 2021.

(51) Int. Cl.
*G06F 3/14* (2006.01)
*H04M 1/02* (2006.01)

(56) References Cited

U.S. PATENT DOCUMENTS

| | | |
|---|---|---|
| 10,743,428 B2 | 8/2020 | Cho |
| 10,860,201 B2 | 12/2020 | Kang et al. |
| 10,866,731 B2 | 12/2020 | Yang et al. |
| 10,990,208 B2 | 4/2021 | Jung et al. |
| 11,474,692 B2 | 10/2022 | Lee et al. |
| 2014/0378183 A1 | 12/2014 | Xiong et al. |
| 2015/0186944 A1 | 7/2015 | Forsblom |
| 2015/0242065 A1 | 8/2015 | Ko et al. |
| 2016/0378270 A1 | 12/2016 | Lee et al. |
| 2017/0011714 A1 | 1/2017 | Eim et al. |
| 2018/0067712 A1 | 3/2018 | Behzadi et al. |
| 2018/0342225 A1* | 11/2018 | Yun .................. H04N 21/431 |
| 2019/0261519 A1 | 8/2019 | Park et al. |
| 2021/0014613 A1* | 1/2021 | Carrigan .............. H04R 1/1041 |
| 2021/0072846 A1 | 3/2021 | Jang et al. |
| 2021/0357169 A1 | 11/2021 | Hulbert et al. |
| 2022/0365562 A1 | 11/2022 | Ahn et al. |
| 2023/0051261 A1 | 2/2023 | Kim |

FOREIGN PATENT DOCUMENTS

| | | |
|---|---|---|
| KR | 10-2016-0146970 A | 12/2016 |
| KR | 10-2017-0000553 A | 1/2017 |
| KR | 10-2017-0043374 A | 4/2017 |
| KR | 10-2017-0059815 A | 5/2017 |
| KR | 10-2019-0022883 A | 3/2019 |
| KR | 10-2019-0069877 A | 6/2019 |
| KR | 10-2019-0101184 A | 8/2019 |
| KR | 10-2019-0128843 A | 11/2019 |
| KR | 10-2020-0008922 A | 1/2020 |
| KR | 10-2020-0084980 A | 7/2020 |

* cited by examiner

FIG. 15
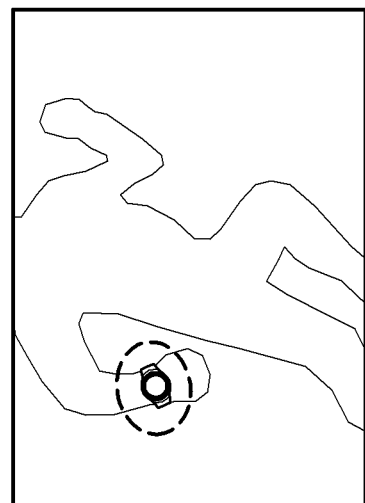
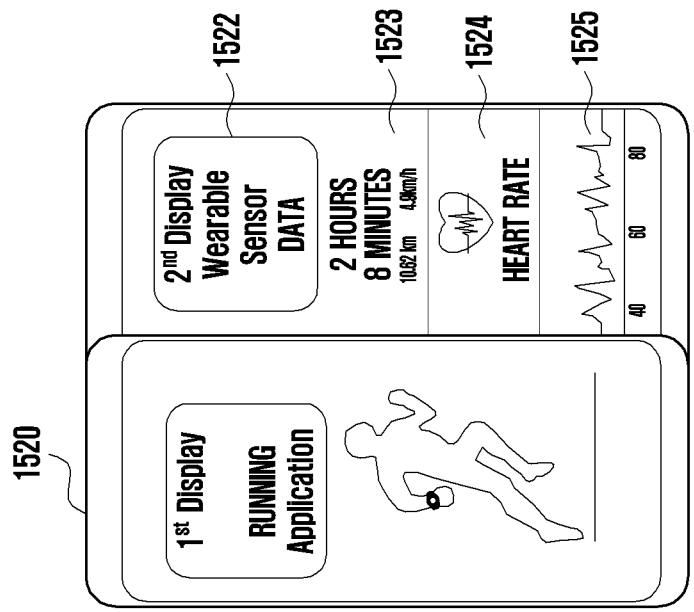

ELECTRONIC DEVICE COMPRISING EXPANDABLE DISPLAY, AND METHOD FOR PROVIDING CONTENT OF ELECTRONIC DEVICE

CROSS-REFERENCE TO RELATED APPLICATION(S)

This application is a continuation application of prior application Ser. No. 18/308,289, filed on Apr. 27, 2023, which has issued as U.S. Pat. No. 11,907,494 on Feb. 20, 2024, which is a continuation application, claiming priority under § 365(c), of an International application No. PCT/KR2021/015527, filed on Nov. 1, 2021, which is based on and claims the benefit of a Korean patent application number 10-2020-0167862, filed on Dec. 3, 2020, in the Korean Intellectual Property Office, and of a Korean patent application number 10-2021-0001549, filed on Jan. 6, 2021, in the Korean Intellectual Property Office, the disclosure of each of which is incorporated by reference herein in its entirety.

BACKGROUND

1. Field

The disclosure relates to an electronic device and a method of providing content of the electronic device. More particularly, the disclosure relates to an electronic device including an expandable display and a method of providing content on a display in an electronic device including an expandable display.

2. Description of Related Art

Electronic devices such as televisions (TVs), tablet personal computers (PCs), and smartphones may provide user experiences via various applications beyond their own functions such as broadcasting screen output or call functions. For example, an electronic device may provide various multimedia contents via a display, and may also provide contents shared from other external devices. Recently, in order to provide various user experiences and satisfy spatial efficiency, electronic devices having displays of various form factors have been developed. For example, the electronic device may be equipped with an expandable display such as a slidable or rollable display.

The above information is presented as background information only to assist with an understanding of the disclosure. No determination has been made, and no assertion is made, as to whether any of the above might be applicable as prior art with regard to the disclosure.

SUMMARY

Wearable devices (for example, smart watches) may be difficult to set the device due to a small or no screen, and there may be limitations in setting conditions.

When such a wearable device is used in interlocking with an electronic device having a wide screen, there is an advantage in that device settings may be performed more conveniently and efficiently. However, in case that a content is running on the interlocked electronic device, when providing a screen for setting the wearable device, it may interfere with the use of existing content.

Aspects of the disclosure are to address at least the above-mentioned problems and/or disadvantages and to provide at least the advantages described below. Accordingly, an aspect of the disclosure is to present a user with content that matches the content currently running on the interlocked electronic device in displaying content related to other wearable devices on an expandable display.

Another aspect of the disclosure is to provide an electronic device including an expandable display capable of outputting a content to an appropriate location and a method for providing the content considering the content currently running on the interlocked electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a display including a main display area and at least one expansion display area expandable from the main display area, a communication module, and a processor operatively connected to the display and the communication module, wherein the processor is configured to execute an application of the electronic device in a first state in which the display is not expanded or in a second state in which the display is expanded to display a first content on the display, establish a connection with an external device via the communication module, receive a context generated from the external device, determine a position to display a second content related to the context, from among the main display area or the at least one expansion display area based on the type of the first content and whether the display is in the first state or the second state when the context is received, and display the second content at the determined position.

In accordance with another aspect of the disclosure, a method of providing contents of an electronic device is provided. The method includes identifying whether an external device is operatively connected to the electronic device, receiving a context generated from the external device, determining a second content to be added to the display considering a type of first content including application information running on the electronic device, and the external device, and selecting where to display the second content on the display based on a first content including application information running on the electronic device and whether the display is in a first state in which the display is unexpanded or a second state in which the display is expanded.

According to various embodiments, it is possible to set a wearable device in an expanded area, thereby solving the difficulty of setting on a small screen.

It is possible to provide convenience to a user by providing appropriate additional content considering the content running on the electronic device and the connected wearable device, and because the location of the additional content is determined considering the content running on the electronic device, new content may be provided without disturbing the enjoyment of the content running on the existing electronic device.

By providing a setting screen set by a user in advance, the user may quickly set the device, and the trouble of finding the corresponding setting screen may be solved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the drawings, in which:

FIG. 15 illustrates an example of providing contents of an electronic device and contents of an external device on a display of the electronic device according to an embodiment of the disclosure;

FIG. 18 illustrates an example of displaying contents of an electronic device and a notification screen for a new situation on a display of the electronic device according to an embodiment of the disclosure; and.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
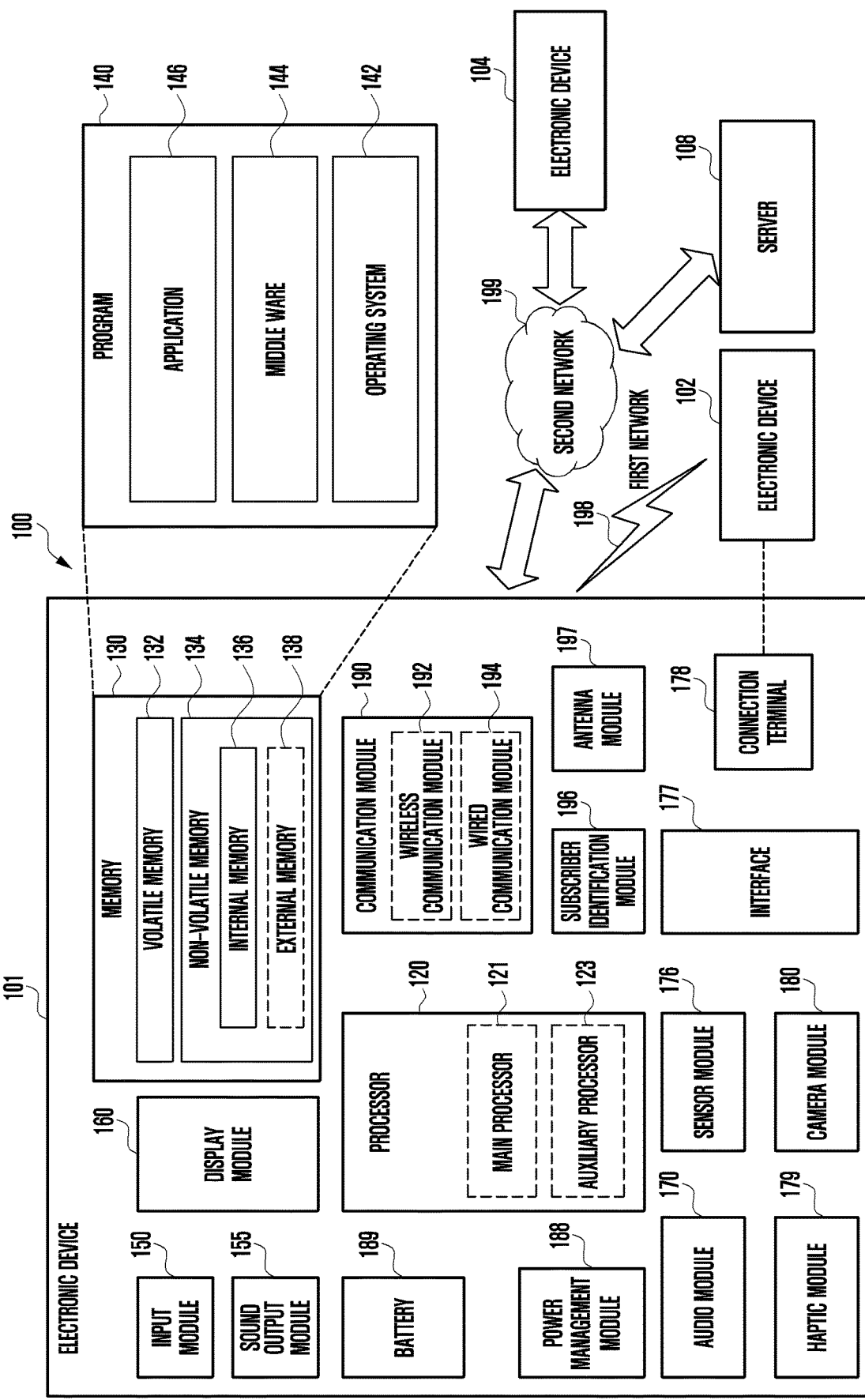
FIG. 1 is a block diagram of an electronic device in a network environment, according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment, the electronic device 101 may communicate with the external electronic device 104 via the server 108. According to another embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to a further embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to yet another embodiment, the auxiliary processor 123 (e.g., an image signal processor or a communication processor) may be implemented as part of another component (e.g., the camera module 180 or the communication module 190) functionally related to the auxiliary processor 123. According to still another embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to another embodiment, the display module 160 may include a touch sensor adapted to detect a touch, or a pressure sensor adapted to measure the intensity of force incurred by the touch.

The audio module 170 may convert a sound into an electrical signal and vice versa. According to yet another embodiment, the audio module 170 may obtain the sound via the input module 150, or output the sound via the sound output module 155 or a headphone of an external electronic device (e.g., an external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to a further embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to yet another embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the external electronic device 102). According to still another embodiment, the connection terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to another embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to a further embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to yet another embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter (mm)Wave band) to achieve, e.g., a high data transmission rate. The wireless communication module 192 may support various technologies for securing performance on a high-frequency band, such as, e.g., beam-forming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to another embodiment, the antenna module 197 may include an antenna including a radiating element composed of a conductive material or a conductive pattern formed in or on a substrate (e.g., a printed circuit board (PCB)). According to yet another embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to still another embodiment, another component (e.g., a radio frequency integrated circuit (RFIC)) other than the radiating element may be additionally formed as part of the antenna module 197.

According to various embodiments, the antenna module 197 may form a mmWave antenna module. According to a further embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic device 102 or the external electronic device 104 may be a device of a same type as, or a different type, from the electronic device 101. According to another embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be at least one of an intelligent server using machine learning or a neural network. According to yet another embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to a further embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to yet another embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
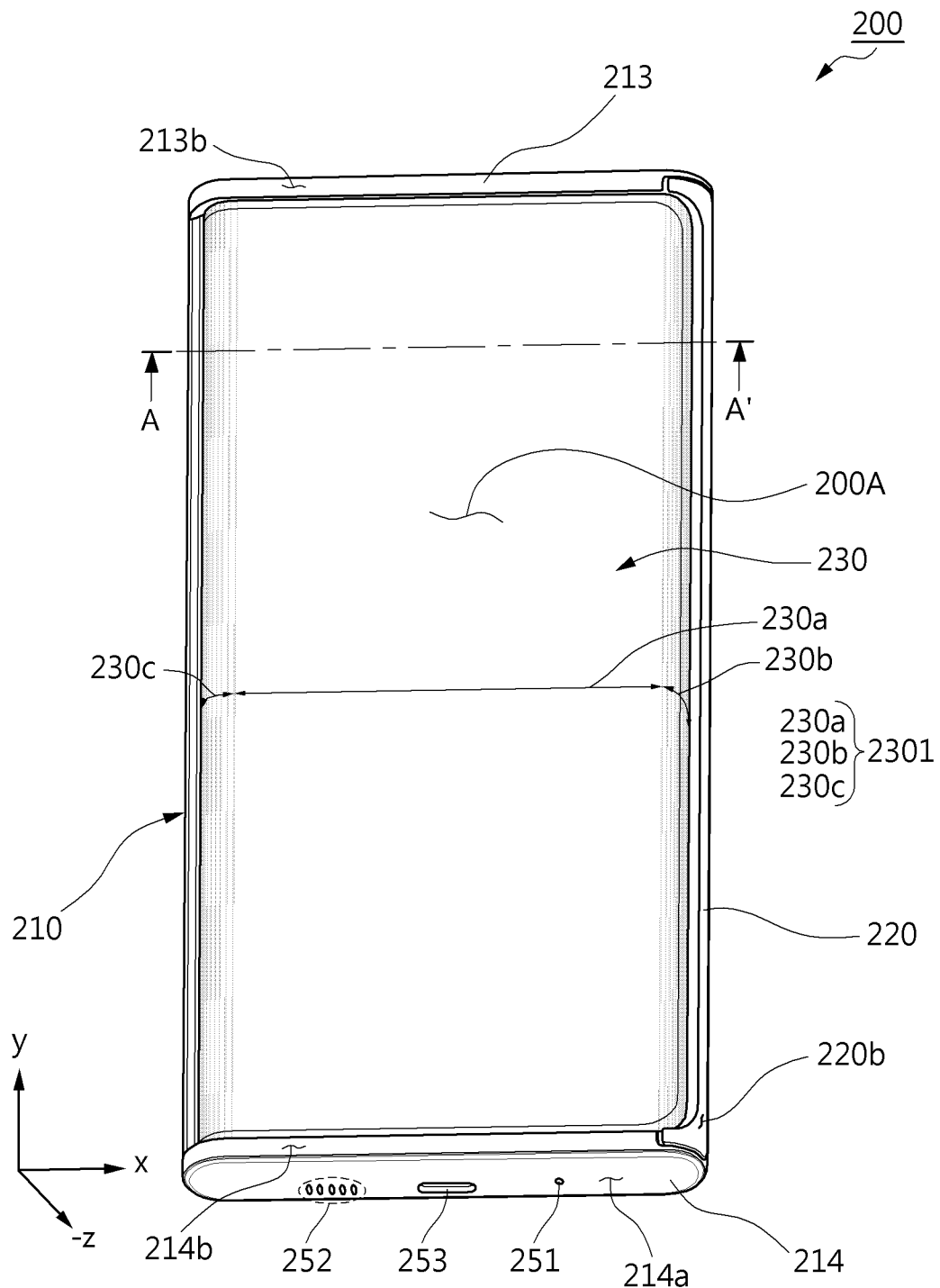
FIG. 2A is a front perspective view of an electronic device in a closed state according to an embodiment of the disclosure.

FIG. 2A is a front perspective view of an electronic device in a closed state according to an embodiment of the disclosure.

Figure 2B:
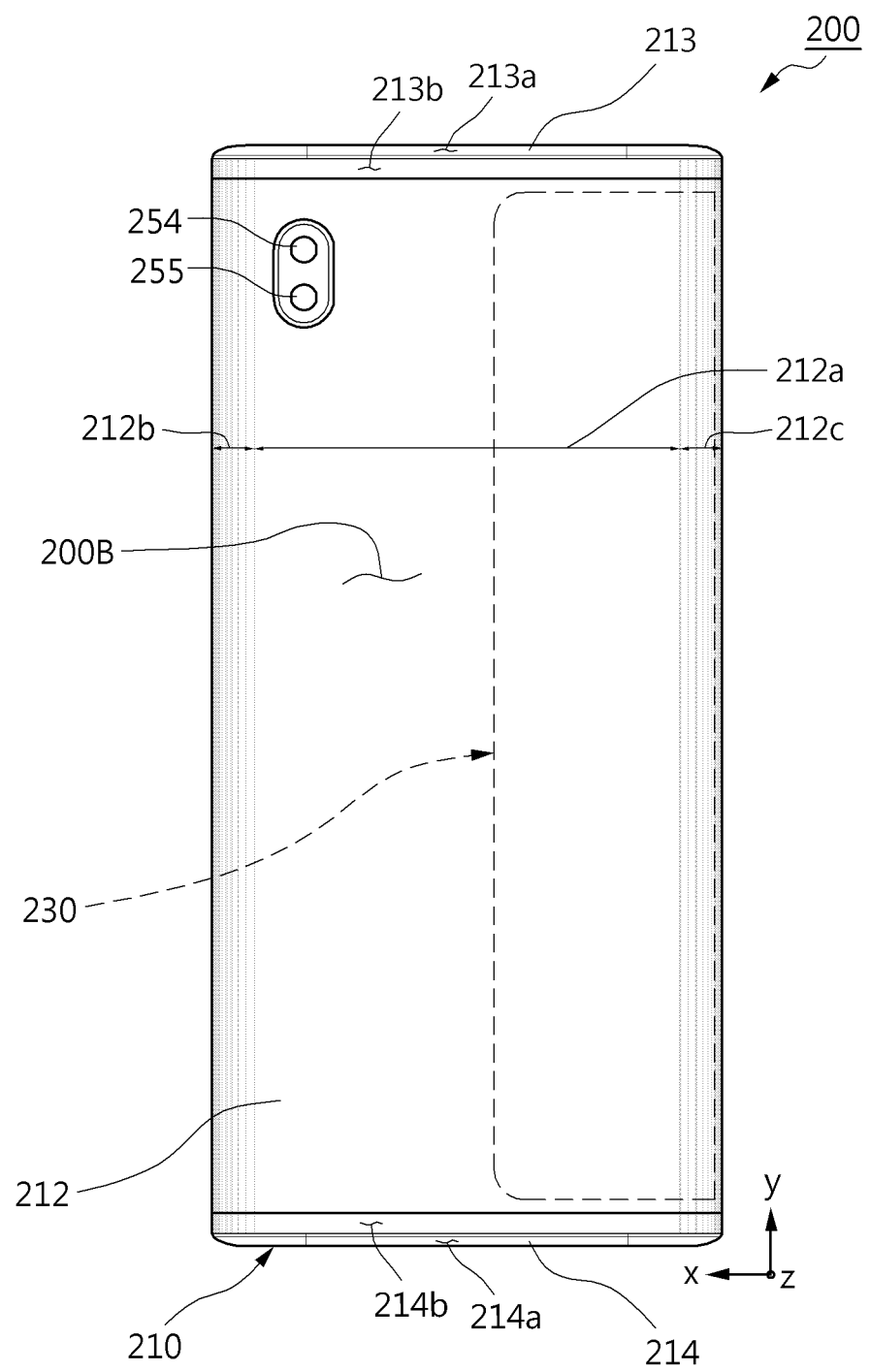
FIG. 2B is a rear perspective view of an electronic device in a closed state according to an embodiment of the disclosure.

FIG. 2B is a rear perspective view of an electronic device in a closed state according to an embodiment of the disclosure.

Figure 2C:
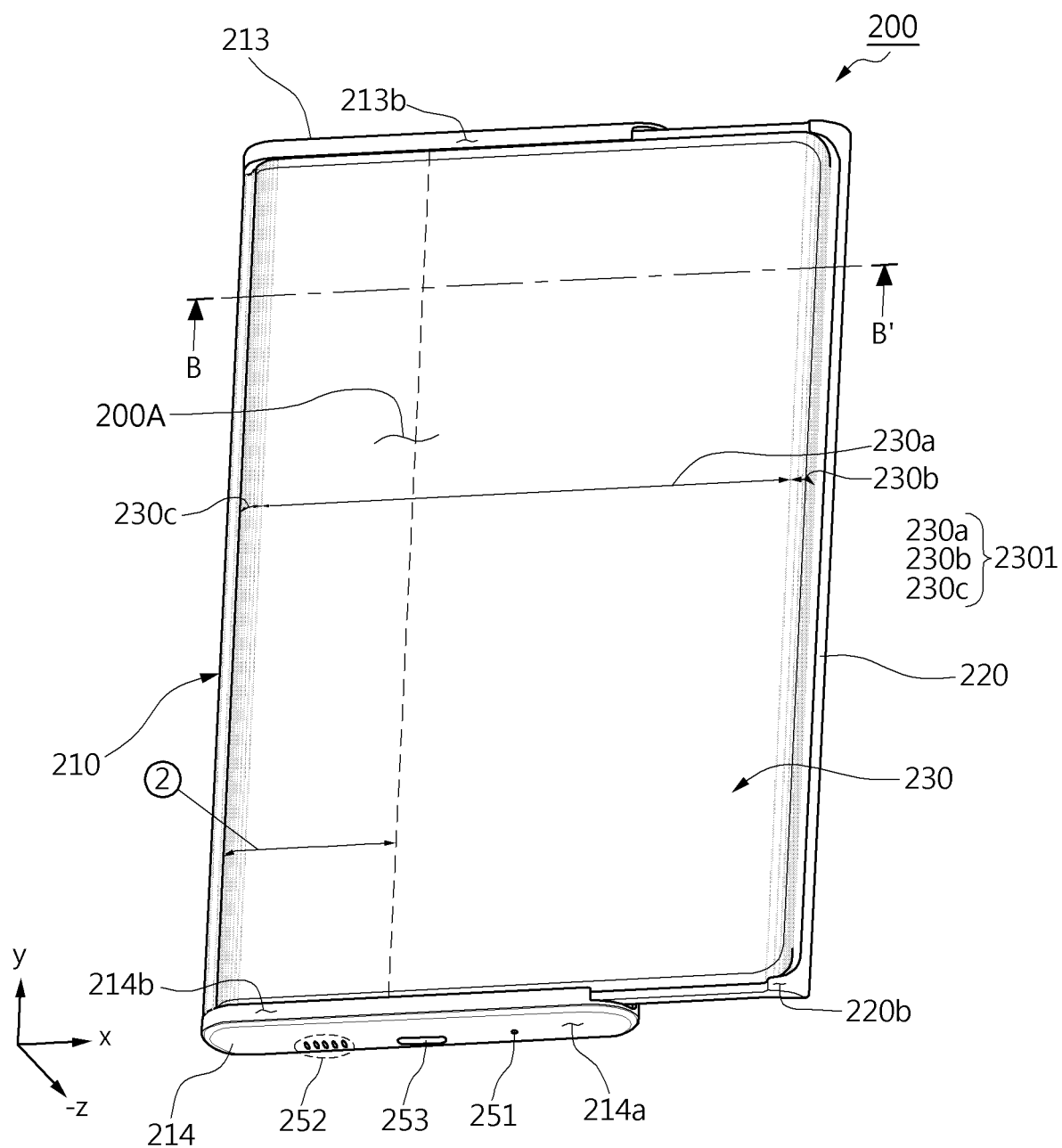
FIG. 2C is a front perspective view of an electronic device in an open state according to an embodiment of the disclosure.

FIG. 2C is a front perspective view of an electronic device in an open state according to an embodiment of the disclosure.

Figure 2D:
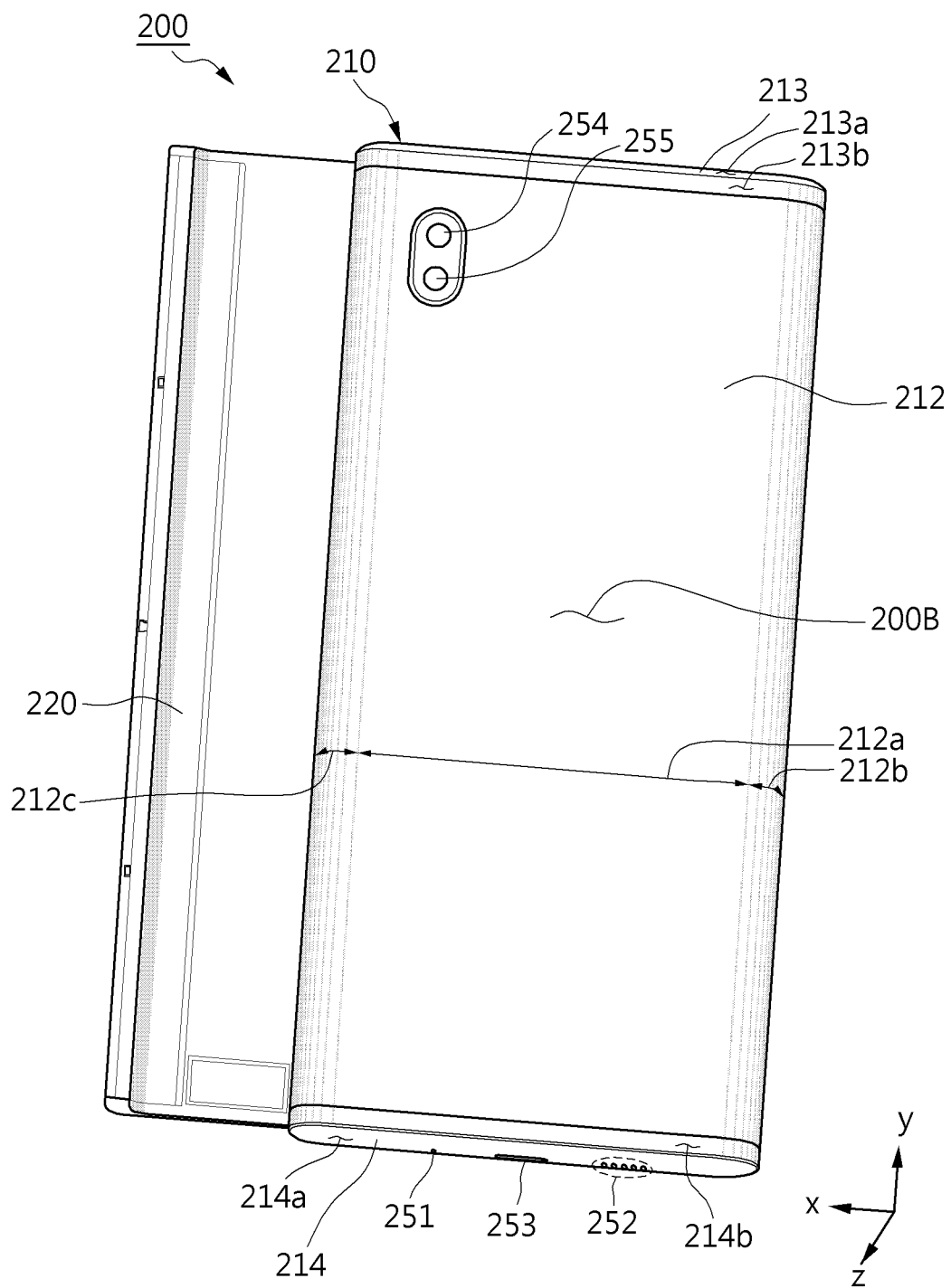
FIG. 2D is a rear perspective view of an electronic device in an open state according to an embodiment of the disclosure.

FIG. 2D is a rear perspective view of an electronic device in an open state according to an embodiment of the disclosure.

According to various embodiments, the electronic device 200 of FIG. 2A may include the electronic device 101 of FIG. 1.

Referring to FIGS. 2A, 2B, 2C, and 2D, in various embodiments, the electronic device 200 may be implemented to expand a screen 2301 in a sliding manner. For example, the screen 2301 may be an externally visible area of a flexible display 230. FIGS. 2A and 2B illustrate the electronic device 200 in a state in which the screen 2301 is not expanded, and FIGS. 2C and 2D illustrate the electronic device 200 in a state in which the screen 2301 is expanded. The state in which the screen 2301 is not expanded is a state in which a sliding plate 220 for sliding motion of the flexible display 230 is not slid out, and may be referred to as a 'closed state' hereinafter. The state in which the screen 2301 is expanded is a state in which the screen 2301 is no longer expanded by sliding out of the sliding plate 220, and may be referred to as an 'open state' hereinafter. For example, sliding out may mean that the sliding plate 220 moves at least partially in a first direction (e.g., +x-axis direction) when the electronic device 200 is switched from the closed state to the open state. According to various embodiments, the open state may be defined as a state in which the screen 2301 is expanded compared to the closed state, and screens of various sizes may be provided according to a moving position of the sliding plate 220. According to various embodiments, an intermediated state may refer to a state between the closed state of FIG. 2A and the open state of FIG. 2C. The screen 2301 may include an active area of the flexible display 230 that is visually exposed and enables output of an image, and the electronic device 200 may adjust the active area according to the movement of the sliding plate 220 or the movement of the flexible display 230. In the following description, the open state may refer to a state in which the screen 2301 is maximally expanded. In some embodiments, the flexible display 230 that is disposed in the electronic device 200 of FIG. 2A to allow a sliding motion and provides the screen 2301 may be referred to as a 'slide-out display' or an 'expandable display'. According to various embodiments, the electronic device 200 including the flexible display 230 may include the electronic device 101 of FIG. 1.

According to an embodiment, the electronic device 200 may include a sliding structure related to the flexible display 230. For example, when the flexible display 230 is moved to a set distance by an external force, the electronic device may be switched from the closed state to the open state or from the open state to the closed state without any further external force due to an elastic structure included in the sliding structure (e.g., semi-automatic slide motion).

According to another embodiment, when a signal is generated via an input device included in the electronic device 200, the electronic device 200 may be switched from the closed state to the open state or from the open state to the closed state due to a driving device such as a motor connected to the flexible display 230. For example, when a signal is generated via a hardware button or a software button provided via the screen, the electronic device 200 may be switched from the closed state to the open state or from the open state to the closed state.

According to yet another embodiment, when a signal is generated from various sensors such as a pressure sensor, the electronic device 200 may be switched from the closed state to the open state or from the open state to the closed state. For example, when carrying or holding the electronic device 200 by hand, a squeeze gesture in which a part of the hand (e.g., palm or finger) presses within a specified section of the electronic device 200 may be detected by a sensor, and in response to this, the electronic device 200 may be switched from the closed state to the open state or from the open state to the closed state.

According to a further embodiment, the flexible display 230 may include a second section ② (refer to FIG. 2C). The second section ② may include an expanded part of the screen 2301 when the electronic device 200 is switched from the closed state to the open state. When the electronic device 200 is switched from the closed state to the open state, the second section ② is drawn out of the inner space of the electronic device 200 in a sliding manner, and as a result, the screen 2301 may be expanded. When the electronic device 200 is switched from the open state to the closed state, at least a part of the second section ② is drawn into the inner space of the electronic device 200 in a sliding manner, and as a result, the screen 2301 may be reduced. When the electronic device 200 is switched from the open state to the closed state, at least a part of the second section ② may be bent and moved to the inner space of the electronic device 200. For example, the flexible display 230 may include a flexible substrate (e.g., a plastic substrate) composed of a polymer material including polyimide (PI) or polyester (PET). The second section ② is a bent part of the flexible display 230 when the electronic device 200 switches between the open state and the closed state, and may be referred to as, for example, a bendable section. In the following description, the second section ② will be referred to as the bendable section.

According to still another embodiment, the electronic device 200 may include a housing 210, a sliding plate 220, or the flexible display 230.

The housing (or case) 210 may include, for example, a back cover 212, a first side cover 213, or a second side cover 214. The back cover 212, the first side cover 213, or the second side cover 214 may be connected to a support member (not illustrated) positioned inside the electronic device 200, and may form at least a part of the exterior of the electronic device 200.

The back cover 212 may form, for example, at least a part of the rear surface 200B of the electronic device 200. In an embodiment, the back cover 212 may be substantially opaque. For example, the back cover 212 may be composed of coated or tinted glass, ceramic, polymer, metal (e.g., aluminum, stainless steel (STS), or magnesium), or a combination of at least two of the foregoing. According to a certain embodiment, in a state where the bendable section ② of the flexible display 230 is drawn into the inner space of the housing 210 (e.g., the closed state), at least a part of the bendable section ② be disposed to be visible from the outside via the back cover 212. In this case, the back cover 212 may be composed of at least one of a transparent material or an opaque material.

According to another embodiment, the back cover 212 may include a flat part 212a and curved parts 212b and 212c positioned on opposite sides of each other with the flat part 212a interposed therebetween. The curved parts 212b and 212c may be disposed adjacent to both relatively long edges (not illustrated) of the back cover 212, respectively, and may be bent toward the screen positioned on the opposite side of the back cover 212 and expanded seamlessly. According to a certain embodiment, the back cover 212 may include one of curved parts 212*b* and 212*c* or may be implemented without curved parts 212*b* and 212*c*.

According to a further embodiment, the first side cover 213 and the second side cover 214 may be positioned on opposite sides of each other. For example, the first side cover 213 and the second side cover 214 may be positioned on opposite sides of each other with the flexible display 230 therebetween in the second direction (e.g., the y-axis direction) orthogonal to the first direction (e.g., the +x-axis direction) of sliding out of the sliding plate 220. The first side cover 213 may form at least a part of a first side surface 213*a* of the electronic device 200, and the second side cover 214 may form at least a part of a second side surface 214*a* of the electronic device 200 facing in a direction opposite to the first side surface 213*a*. The first side cover 213 may include a first edge part (or first rim) 213*b* expanded from the edge of the first side surface 213*a*. For example, the first edge part may form at least a part of one side bezel of the electronic device 200. The second side cover 214 may include a second edge part (or second rim) 214*b* expanded from the edge of the second side surface 214*a*. For example, the second edge part 214*b* may form at least a part of the other bezel of the electronic device 200. According to yet another embodiment, in the closed state of FIG. 2A, the surface of the first edge part, the surface of the second edge part 214*b*, and the surface of the sliding plate 220 may be smoothly connected to form a one-sided curved part (not illustrated) corresponding to a first curved part 230*b* of the screen 2301. According to various embodiments, the surface of the first edge part or the surface of the second edge part 214*b* may include another curved part (not illustrated) corresponding to a second curved part 230*c* of the screen 2301 positioned on the opposite side of the first curved part 230*b*.

According to still another embodiment, the sliding plate 220 may perform a sliding motion on a support member (not illustrated) positioned inside the electronic device 200. At least a part of the flexible display 230 may be disposed on the sliding plate 220, and the closed state of FIG. 2A or the open state of FIG. 2C may be formed based on the position of the sliding plate 220 on the support member. According to yet another embodiment, the flexible display 230 may be attached to the sliding plate 220 via an adhesive member (or viscous member) (not illustrated). According to a further embodiment, the adhesive member may include at least one of a heat-reactive adhesive member, a photo-reactive adhesive member, a general adhesive, or a double-sided tape. According to a certain embodiment, the flexible display 230 may be inserted into a recess formed in the sliding plate 220 in a sliding manner and disposed and fixed to the sliding plate 220. The sliding plate 220 serves to support at least a part of the flexible display 230 and may be referred to as a display support structure in a certain embodiment.

According to an embodiment, the sliding plate 220 may include a third edge part 220*b* forming an outer surface of the electronic device 200 (e.g., a surface exposed to the outside to form the exterior of the electronic device 200). For example, the third edge part 220*b* may form a bezel around the screen together with the first edge part and the second edge part 214*b* in the closed state of FIG. 2A. The third edge part 220*b* may expand in the second direction (e.g., the y-axis direction) to connect one end of the first side cover 213 and one end of the second side cover 214 in the closed state. For example, in the closed state of FIG. 2A, the surface of the third edge part 220*b* may be smoothly connected to at least one of the surface of the first edge part or the surface of the second edge part 214*b*.

According to another embodiment, due to the slide-out of the sliding plate 220, at least a part of the bendable section ② may be provided in an expanded state (e.g., open state) of the screen 2301 as illustrated in FIG. 2C while protruding from the inside of the electronic device 200 to the outside.

According to yet another embodiment, in the closed state of FIG. 2A, the screen 2301 may include a flat part 230*a* and at least one of the first curved part 230*b* or the second curved part 230*c* positioned on opposite sides of each other with the flat part 230*a* interposed therebetween. For example, the first curved part 230*b* and the second curved part 230*c* are substantially symmetrical with the flat part 230*a* therebetween. For example, in the closed state of FIG. 2A, at least one of the first curved part 230*b* or the second curved part 230*c* is positioned to correspond to the curved parts 212*b* and 212*c* of the back cover 212, respectively, and is curved toward the back cover 212. When switching from the closed state of FIG. 2A to the open state of FIG. 2C, the flat part 230*a* may be expanded. For example, a partial area of the bendable section ② forming the second curved part 230*c* in the closed state of FIG. 2A may be included in the expanded flat part 230*a* when switching from the closed state of FIG. 2A to the open state of FIG. 2C and may be formed as another area of the bendable section ②.

According to a further embodiment, the electronic device 200 may include at least one of an opening (not illustrated) for drawing in or drawing out the bendable section ② or a pulley (not illustrated) positioned in the opening. The pulley may be positioned corresponding to the bendable section ②, and during a switch between the closed state of FIG. 2A and the open state of FIG. 2C, the movement of the bendable section ② and its movement direction may be guided via rotation of the pulley. The first curved part 230*b* may be formed to correspond to a curved surface formed on one surface of the sliding plate 220. The second curved part 230*c* may be formed by a part corresponding to the curved surface of the pulley in the bendable section ②. The first curved part 230*b* may improve aesthetics of the screen 2301 by being positioned on the opposite side of the second curved part 230*c* in the closed or open state of the electronic device 200. According to a certain embodiment, the flat part 230*a* may be implemented in an expanded form without the first curved part 230*b*.

According to yet another embodiment, the flexible display 230 may additionally include a touch sensing circuit (e.g., a touch sensor). According to various embodiments (not illustrated), the flexible display 230 may be combined with or disposed adjacent to at least one of a pressure sensor capable of measuring the intensity (pressure) of a touch or a digitizer that detects a magnetic field type pen input device (e.g., a stylus pen). For example, the digitizer includes a coil member disposed on a dielectric substrate to detect a resonant frequency of an electromagnetic induction method applied from a pen input device.

According to an embodiment, the electronic device 200 may include a microphone hole 251 (e.g., the input module 150 of FIG. 1), a speaker hole 252 (e.g., the sound output module 155 of FIG. 1), a connector hole 253 (e.g., the connection terminal 178 of FIG. 1), a camera module 254 (e.g., the camera module 180 of FIG. 1), or a flash 255. According to various embodiments, the flash 255 may be included in the camera module 254 and implemented. In some embodiments, the electronic device 200 may omit at least one of the components or additionally include other components.

For example, the microphone hole 251 may be composed on at least a part of the second side surface 214a to correspond to a microphone (not illustrated) positioned inside the electronic device 200. The location of the microphone hole 251 is not limited to the embodiment of FIG. 2A and may vary. According to a certain embodiment, the electronic device 200 may include a plurality of microphones capable of detecting the direction of sound.

For example, the speaker hole 252 may be composed on at least a part of the second side surface 214a to correspond to a speaker positioned inside the electronic device 200. The location of the speaker hole 252 is not limited to the embodiment of FIG. 2A and may vary. According to various embodiments, the electronic device 200 may include a receiver hole for communication. In a certain embodiment, the microphone hole 251 and the speaker hole 252 may be implemented as single hole, or the speaker hole 252 may be omitted like a piezo speaker.

For example, the connector hole 253 may be composed on at least a part of the second side surface 214a to correspond to a connector (e.g., a USB connector) positioned inside the electronic device 200. The electronic device 200 may transmit power, receive power, transmit data, or receive data with an external electronic device electrically connected to the connector via the connector hole 253. The location of the connector hole 253 is not limited to the embodiment of FIG. 2A and may vary.

For example, the camera module 254 and the flash 255 may be positioned on the rear surface 200B of the electronic device 200. The camera module 154 may include at least one of one or more lenses, an image sensor, or an image signal processor. The flash 255 may include, for example, a light emitting diode or a xenon lamp. In a certain embodiment, two or more lenses (infrared camera, wide-angle and telephoto lenses) and image sensors may be positioned on one side of electronic device 200. According to various embodiments, the electronic device 200 may include a plurality of camera modules without being limited to the embodiment of FIG. 2B or 2D. The camera module 254 may be one of a plurality of camera modules. For example, the electronic device 200 may include a plurality of camera modules (e.g., a dual camera or a triple camera) each having a different property (e.g., angle of view) or function. For example, a plurality of camera modules (e.g., the camera module 254) including lenses having different angles of view may be configured, and the electronic device 200 may control the angle of view of the camera module performed in the electronic device 200 to be changed based on the user's selection. In addition, the plurality of camera modules may include at least one of a wide-angle camera, a telephoto camera, a color camera, a monochrome camera, or an infrared (IR) camera (e.g., a time of flight (TOF) camera or a structured light camera). According to another embodiment, the IR camera may operate as at least a part of a sensor module (not illustrated).

According to various embodiments (not illustrated), the electronic device 200 may additionally include a camera module (e.g., a front camera) generating an image signal based on light received via one surface (e.g., the front surface 200A) of the electronic device 200 placed in a direction in which the screen 2301 faces. For example, the camera module 254 may be not limited to the embodiment of FIG. 2B or 2D, and may be positioned inside the housing 210 while being aligned with an opening (e.g., a via hole or a notch) disposed in the flexible display 230. The camera module 254 may generate an image signal by receiving light via the opening and a partial area of the transparent cover overlapping the opening. The transparent cover serves to protect the flexible display 230 from the outside, and may include, for example, a material such as polyimide or ultra-thin glass (UTG).

According to a certain embodiment, the camera module 254 may be not limited to the embodiment of FIG. 2B or 2D, and may be disposed below at least a part of the screen 2301 of the flexible display 230, and may perform a related function (e.g., an image capture) without visually distinguishing (or exposing) the position of the camera module 254. In this case, for example, when viewed from above the screen 2301 (e.g., when viewed in the −z axis direction), the camera module 254 may be disposed to overlap at least a part of the screen 2301 and obtain an image of an external subject without being exposed to the outside.

According to various embodiments (not illustrated), the electronic device 200 may additionally include a key input device (e.g., the input module 150 of FIG. 1). The key input device may be positioned, for example, on the first side surface 213a of the electronic device 200 formed by the first side cover 213. In a certain embodiment (not illustrated), the key input device may include at least one sensor module.

According to various embodiments (not illustrated), the electronic device 200 may include various sensor modules (e.g., the sensor module 176 of FIG. 1). The sensor module may generate an electrical signal or data value corresponding to an internal operating state of the electronic device 200 or an external environmental state. For example (not illustrated), the sensor module may include a proximity sensor generating a signal related to the proximity of an external object based on light received via the front surface 200A of the electronic device 200 placed in the direction the screen 2301 faces. For another example (not illustrated), the sensor module may include various biometric sensors such as a fingerprint sensor or a heart rate monitor (HRM) sensor for detecting biometric information based on light received via the front surface 200A or the rear surface 200B of the electronic device 200. The electronic device 200 may include various other sensor modules, for example, a gesture sensor, a gyro sensor, an air pressure sensor, a magnetic sensor, an acceleration sensor, a grip sensor, a color sensor, an infrared (IR) sensor, a biosensor, a temperature sensor, a humidity sensor, or an illuminance sensor.

According to various embodiments, not limited to the embodiments of FIGS. 2A, 2B, 2C, and 2D, the electronic device 200 may be implemented in a structure in which the screen expands toward the third edge part 220b when the sliding plate 220 slides out. For example, a partial area of the flexible display 230 forming the first curved part 230b in the closed state of FIG. 2A may be included in the expanded flat part 230a when switching from the closed state of FIG. 2A to the open state of FIG. 2C, and may be formed as another area of the flexible display 230.

Figure 3:
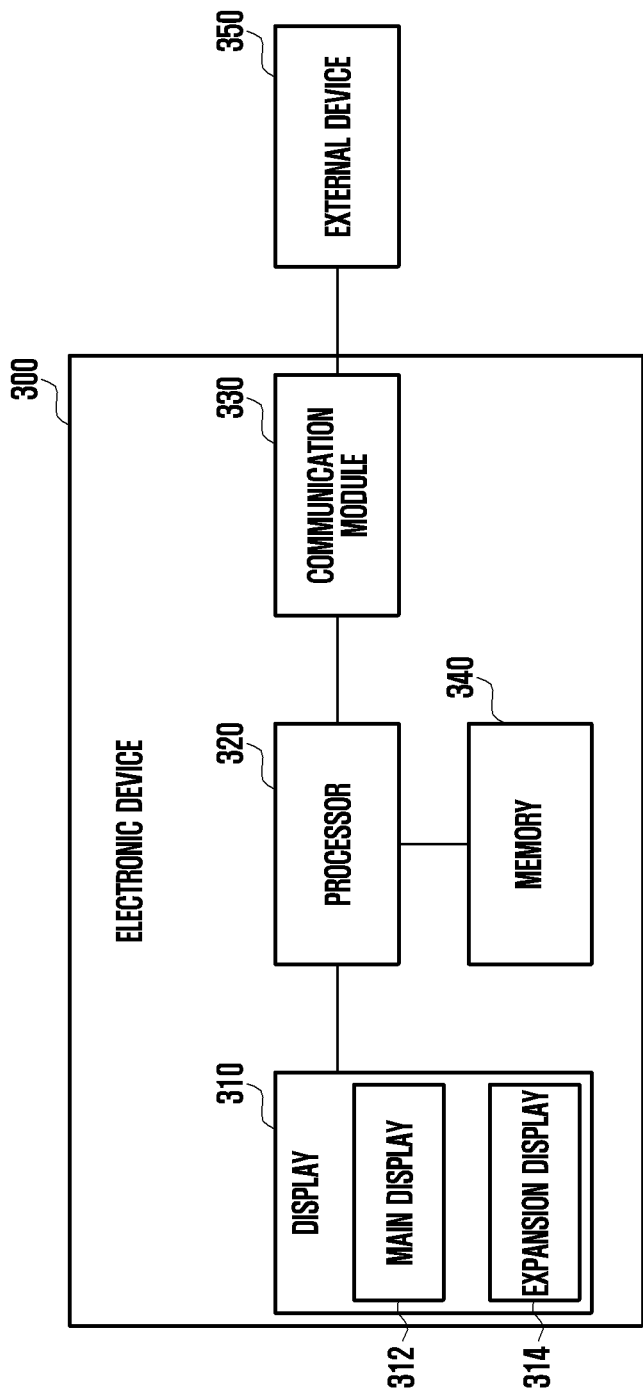
FIG. 3 is a block diagram of an electronic device according to an embodiment of the disclosure.

FIG. 3 is a block diagram of an electronic device according to an embodiment of the disclosure.

Referring to FIG. 3, the electronic device 300 may include a display 310, a processor 320, a communication module 330, and a memory 340, and implement various embodiments of the disclosure even if at least some of the illustrated components are omitted or replaced. The electronic device 300 may additionally include at least some of the configurations or functions of the electronic device 101 of FIG. 1.

Some (e.g., the communication module 330 and the processor 320) of the components illustrated in FIG. 3 or other components of the electronic device 300 not illustrated may be disposed inside the housing (not illustrated) of the electronic device 300, and at least a part of some components (e.g., the display 310) may be exposed to the outside of the housing.

According to various embodiments, the display 310 may display content provided from the processor 320. For example, the display 310 may display main content (or first content) generated from an application executed via the processor 320 or additional content (or second content) obtained from an external device 350 via the communication module 330.

Figure 4:
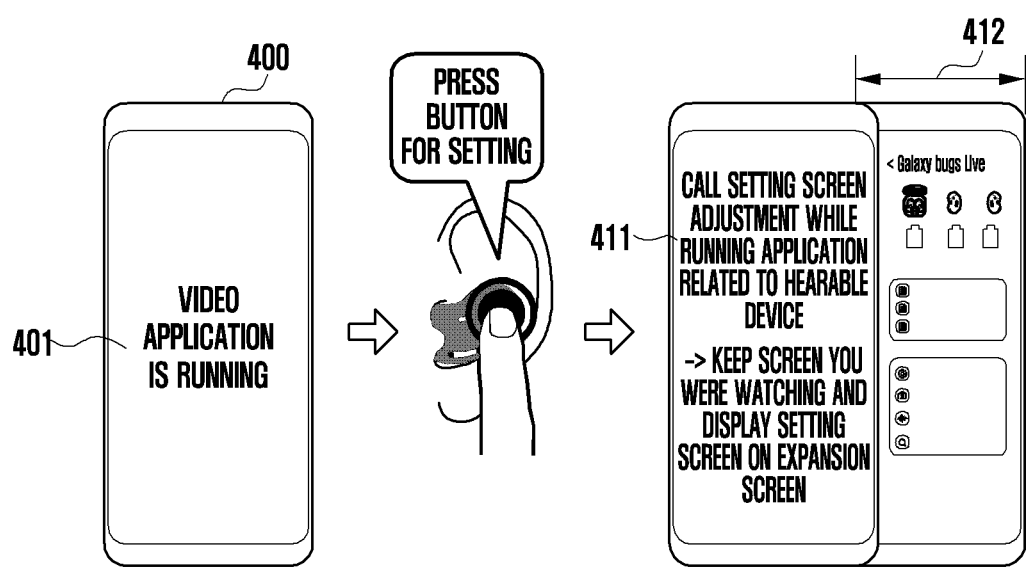
FIG. 4 illustrates an example of providing contents of an electronic device and contents of an external device on a display of the electronic device according to an embodiment of the disclosure.

According to various embodiments, the display 310 may include a main display area 312 (e.g., a main display area 411 of FIG. 4) and at least one expansion display area 314 (e.g., an expansion display area 412 of FIG. 4). The display 310 may include at least one expansion display area 314 that is expandable from the main display area 312 to at least one of up, down, left, and right directions. For example, when the display 310 is drawn in, only the main display area 312 is exposed to the outside to output a screen, and the expansion display area 314 accommodated inside the housing and not exposed to the outside may not output a screen in an inactive state. When the display 310 is drawn out, at least a part of the expansion display area 314 is exposed to the outside, and in this way, the expansion display area 314 is switched into an active state and the screen may be output. According to various embodiments, the display 310 may be configured as a touch screen that detects at least one of a touch or a proximity touch (or hovering) input using a user's body part (e.g., a finger) or an input device (e.g., a stylus pen). Hereinafter, a state in which the display is not expanded may be defined as a first state and an expanded state as a second state.

According to various embodiments, the communication module 330 may provide a wired or wireless communication interface to the external device 350. For example, the communication module 330 may include a high definition multimedia interface (HDMI) and a universal serial bus (USB) interface as an example of wired communication interface (e.g., the interface 177 of FIG. 1). In addition, the communication module 330 may include a wireless communication module (e.g., the wireless communication module 192 of FIG. 1) supporting the external device 350 and the local area communication module. The wireless communication module may support various local area wireless communication methods (e.g., Wi-Fi, Bluetooth, and Bluetooth Low Energy (BLE)), and include independent hardware and/or software configurations for supporting each wireless communication method.

According to various embodiments, the memory 340 may temporarily or permanently store various data including volatile memory and non-volatile memory. The memory 340 may include at least some of the configuration and/or functions of the memory 130 of FIG. 1 and may store the program 140 of FIG. 1.

The memory 340 may store various instructions that may be executed by the processor 320. These instructions may include control commands such as arithmetic and logic operations, data movement, and input/output that can be recognized by the processor 320.

According to various embodiments, the processor 320 is a component capable of performing calculations or data processing related to at least one of control or communication of each component of the electronic device 300, and may be composed of one or more processors 320. The processor 320 may include at least some of the components and/or functions of the processor 120 of FIG. 1. The processor 320 may be operatively, functionally and/or electrically connected to each component of the electronic device 300, such as the display 310.

According to various embodiments, calculation and data processing functions that the processor 320 may implement on the electronic device 300 will not be limited, but hereinafter, various embodiments for determining an area to display main content and additional content on the display 310 and expanding the display 310 accordingly will be described. Operations of the processor 320 to be described later may be performed by loading instructions stored in the memory 340.

According to various embodiments, the processor 320 may display main content (or first content) on the main display area in a state where the display 310 is not expanded. Here, the main content may be content generated when the electronic device 300 executes an application (e.g., an internet browser, a game, or a gallery). In a state where the display 310 is not expanded, the expansion display area is drawn into the housing, and the processor 320 may control the expansion display area to be in an inactive state.

According to various embodiments, the processor 320 may establish a local area wireless communication connection with the external device 350 via the communication module 330. For example, the external device 350 may be connected via local area wireless communication such as wireless-fidelity (Wi-Fi) Direct, Wi-Fi Aware, and Bluetooth.

According to various embodiments, the electronic device 300 may execute an application, and the application may include content related to functions of the external device. For example, when the external device is an audio output device (e.g., earbuds or earphones), the application running on the electronic device 300 may be an application that outputs audio data (e.g., a music application or a video application). Alternatively, the application may be an application (e.g., an Internet browser) that does not use functions of the external device.

According to various embodiments, a context may be received from the external device while an application is running. The context may be generated in the external device and transmitted to the processor 320 via the communication module 330.

According to another embodiment, the context generated from the external device may include at least one of a first context including information related to settings of the external device, a second context including information related to data collected from the external device and a third context including information unrelated to an application running on the electronic device.

According to various embodiments, when a context is received from the external device 350, the processor 320 of the electronic device 300 may determine the contents and display position of the second content by considering the type of the external device 350 and the type of received context, the current state of the display 310, and the application (or first content) currently running on the electronic device 300.

The external device 350 may include, for example, an audio output device (e.g., earbuds, earphones), a wearable device (e.g., a smartwatch, a smart band) that may be used during exercise, or an AR device. However, this is only an example and the type of external device is not limited thereto. The first content may include, for example, a case in which the running application includes only visual information, a case in which the application is running in the background, and a case in which both visual and auditory information are included. However, this is only one embodiment and the type of first content is not limited thereto. The state of the display 310 may be classified into, for example, a first state in which the display is not expanded or a second state in which the display is expanded.

According to a further embodiment, the external device 350 may correspond to an audio output device (e.g., earbuds or earphones), the first content may correspond to a music application running in the background, and the state of the electronic device 300 may correspond to an unexpanded first state. In this case, the processor 320 may determine the content and display position of the second content considering all corresponding data. This will be described in detail with reference to FIGS. 4 and 11.

According to yet another embodiment, the external device 350 may correspond to an audio output device (e.g., earbuds or earphones), the first content may correspond to an application that does not provide auditory information, and the state of the electronic device 300 may correspond to an unexpanded first state. In this case, the processor 320 may determine the content and display position of the second content considering all corresponding data. This will be described in detail with reference to FIGS. 5 and 10.

According to still another embodiment, the external device 350 may correspond to an audio output device (e.g., earbuds or earphones), the first content may correspond to a music application running in the background, and the state of the electronic device 300 may correspond to an expanded second state. In this case, the processor 320 may determine the content and display position of the second content considering all corresponding data. This will be described in detail with reference to FIG. 6.

According to a further embodiment, the external device 350 may correspond to an audio output device (e.g., earbuds or earphones), the first content may correspond to a video application that includes both visual and auditory information, and the state of the electronic device 300 may correspond to an unexpanded first state. In this case, the processor 320 may determine the content and display position of the second content considering all corresponding data. This will be described in detail with reference to FIG. 12.

According to another embodiment, the external device 350 may correspond to an AR device, the first content may correspond to a virtual reality (VR) or augmented reality (AR) related application that includes both visual and auditory information, and the state of the electronic device 300 may correspond to an expanded second state. In this case, the processor 320 may determine the content and display position of the second content considering all corresponding data. This will be described in detail with reference to FIG. 14.

According to yet another embodiment, the external device 350 may correspond to a wearable device (e.g., a smartwatch, a smart band) that may be used during exercise, the first content may correspond to a healthcare-related application that includes both visual and auditory information, and the state of the electronic device 300 may correspond to an unexpanded first state. In this case, the processor 320 may determine the content and display position of the second content considering all corresponding data. This will be described in detail with reference to FIGS. 15 to 18.

According to an embodiment, the processor 320 may determine the second content by determining relevance with the first content among the contexts received from the external device 350.

For example, when the external device is an audio output device (e.g., earbuds or earphones), the application running on the electronic device 300 may correspond to an application that outputs audio data (e.g., a music application or a video application). In this case, the second content may include the first context related to the setting of the audio output device.

For example, when the external device is a wearable device (e.g., a smartwatch, a smart band) that may be used during exercise, the application running on the electronic device may correspond to an application representing an exercise situation (e.g., a health application, a fitness application, or a home training application). In this case, the second content may include a second context related to the user's exercise time, heart rate, and exercise distance.

According to various embodiments, the processor 320 may determine the content of the second content by determining the relationship between the external device 350 and the first content.

According to an embodiment, when the external device 350 is used to execute the first content, the processor 320 may determine a first context related to settings of the external device and a second context including information related to data collected from the external device as the second content. When the external device 350 is not used to execute the first content, the processor 320 may determine the first context related to the setting of the external device 350 as the second content.

According to various embodiments, the processor 320 may display the second content on a partial area of the main display area 312 when the application of the electronic device 300 includes only visual information, display the second content on the entire area of the main display area 312 when the application of the electronic device 300 is running in the background, and expand at least one expansion display area 314 and display the second content in the expanded display area when the application of the electronic device 300 includes both visual information and auditory information According to various embodiments, the processor 320 of the electronic device 300 may receive a context generated from the external device 350, and when the context is received, may determine a position in the main display area 312 or the expansion display area 314 to display the second content related to the context based on whether the display 310 is in the first state or the second state.

According to an embodiment, when the context is received in the first state, the processor 320 may display the first content in the first area of the main display area 312 and display the second content in the second area.

According to an embodiment, when the context is received in the first state, the processor 320 may display the first content on the entire area of the main display area 312 and display the second content on a part of the area of the main display area 312 as a pop-up window.

According to an embodiment, when the context is received in the first state, the processor 320 may expand the display 310, display the first content on the main display area 312, and display the second content on the expansion display area 314.

According to an embodiment, when the context is received in the second state, the processor 320 may display the first content in the main display area 312 and display the second content on the expansion display area 314.

According to various embodiments, when the expansion display area is expanded, the processor 320 may determine the main display area as the first area to display main content, and determine the expansion display area as the second area to display additional content. In this case, the main content may be continuously displayed on the same location before and after the expansion of the display 310, and additional content may be displayed on the expansion display area that expands to either the top, bottom, left, or right side.

According to various embodiments, the processor 320 may determine the first area to display the main content and the second area to display the additional content, based on the user interaction.

According to another embodiment, the processor 320 may determine the first area and the second area based on information received from the external device 350. The external device 350 may execute an application that supports a screen addition function with the electronic device 300, and the application may provide a UI for determining an area in which additional content will be displayed on the expanded display 310 of the electronic device 300. The electronic device 300 may receive information on the selection on the UI of the external device 350 and determine to display additional content in the corresponding area.

According to an embodiment, the processor 320 may determine a screen display type for displaying the main content and the additional content on the expanded display 310. For example, the processor 320 may display the main content on the expanded display 310 while maintaining the display area of the main content while adding the display area of the additional content, or display the display area of the main content and the display area of the additional content in the same size.

According to another embodiment, the processor 320 may adjust the size of the main content and/or the additional content when the first area to display the main content and the second area to display the additional content are determined. For example, when the first content cannot be displayed in the same size as the previous one even on the expanded display 310 as the second content is additionally displayed, the processor reduces the content while maintaining the aspect ratio of the main content. Alternatively, the processor 320 may display only a part of the main content by cutting out parts of the top, bottom, left and right of the main content, or change the aspect ratio (or resolution) of the main content to match the determined size of the first area.

According to various embodiments, when a location to display additional content is determined according to a user interaction, the processor 320 may control the expansion display area corresponding to the location to be expanded. For example, when the display 310 is expandable to the left, right, and both sides, and when it is determined that additional content is displayed on the left side of the main content via the user interaction, the processor 320 controls a motor structure to expand the left side of the display 310 or display guide information for guiding the user to expand the left expansion display area. In addition, when it is determined that additional content is displayed on the right side of the main content via the user interaction, the processor 320 may control the motor structure to expand the right side of the display 310 or display guide information for guiding the user to expand the right expansion display area. In addition, when it is determined that additional content is displayed on both side of the main content via the user interaction, the processor 320 may control the motor structure to expand both side of the display 310 or display guide information for guiding the user to expand the left and right expansion display areas.

According to an embodiment, the electronic device 300 may be connected to a plurality of external devices 350 and display additional content added from the plurality of external devices 350 on the expansion display area. For example, when the electronic device 300 includes the expansion display area that expands in only one direction, the processor 320 may display the first additional content and the second additional content together with the main content by dividing at least a part of the expansion display area and the main display area.

The external device 350 may be connected to the electronic device 300 via the communication module 330.

The external device 350 according to various embodiments may include a circular wearable device (e.g., a watch shape) designed to be wearable by a user and to which a flexible display capable of rolling (or sliding) a display module is applied.

The external device 350 may be implemented as a circular wearable device. According to another embodiment, the wearable external device 350, that is the wearable device, may be generally disposed to expand by a certain length from a component for performing the function of the external device 350, and include a wearable part (e.g., a strap) for fixedly mounting the external device 350 on a part of the body or various structures.

Although the external device 350 according to an embodiment disclosed in the disclosure is implemented in a circular wearable device form factor as an example, the external device 350 and its operation according to various embodiments are not limited thereto. For example, the external device 350 may operate in various form factors capable of expanding the display module in a rollable or slidable manner in various forms such as a rectangular wearable device or an elliptical wearable device, and may also operate therewith. According to an embodiment, the external device 350 may include a form factor such as a rollable wearable device or a slidable wearable device capable of expanding the area of the display module in at least one of a rolling or sliding manner.

According to various embodiments, when the state (e.g., open state, intermediated state, and close state) of the display module 160 changes, the external device 350 may be manually switched by a user or automatically switched via a driving mechanism (e.g., drive motors, reduction gear modules, or gear assemblies) disposed inside the housing. According to an embodiment, the driving mechanism may trigger an operation based on a user input.

According to another embodiment, the user input for triggering an operation of the driving mechanism may include at least one of a touch input, a force touch input, or a gesture input via a display module. For example, when signals are generated from various sensors such as a pressure sensor, the external device 350 is switched from the closed state to the open state or from the open state to the closed state. For example, the external device 350 detects a squeeze gesture in which a part of the user's hand (e.g., palm or finger) presses within a specified section of the external device 350 via a sensor, and accordingly, may be switched from the closed state to the open state or from the open state to the closed state. In another embodiment, the user input for triggering the operation of the driving mechanism may include a voice input (or voice input) or an input of a physical button visually exposed to the outside of the housing.

According to yet another embodiment, the user input for triggering an operation of the driving mechanism may include a touch input via a visually exposed physical button or a force touch input.

FIG. 4 illustrates an example of providing contents of an electronic device and contents of an external device on a display of the electronic device according to an embodiment of the disclosure.

According to an embodiment, when an application of the electronic device 300 includes visual information, the application may be executed on the main display 401.

When an event is received from the external device 350, the processor 320 of the electronic device 300 may determine the content and display position of the second content considering the current state of the electronic device 300 and the relationship between the application being executed on the main display 401 and the external device 350. The event received from the external device 350 may include a context generated by the external device 350, and the context is the same as the context described above in FIG. 3.

Regarding the contents of the additional content, for example, the main content executed on the main display area 401 corresponds to a multimedia (e.g., a music, a game) application or video application including audio-visual information, and the external device 350 may correspond to an audio output device (e.g., earbuds or earphones). In this case, the processor 320 may determine the content related to the setting of the audio output device as the content of the additional content.

Regarding a location to display additional content, for example, the display 310 corresponds to an unexpanded first state 400. The processor 320 may recognize the state of the display 310, recognize that a screen related to a multimedia application or video application including audio-visual information is currently being displayed on the main display area 401, and expand at least one expandable display while maintaining the application running on the main display area 411. Thereafter, the processor 320 may display content related to the settings of the external device (audio output device) 350 determined as additional content on the expanded display area 412. In this case, because additional content may be displayed on the expanded area while maintaining the content and display position of the main content, the user may conveniently receive additional content while continuing to enjoy a multimedia application or video application including audio-visual information being reproduced.

Figure 5:
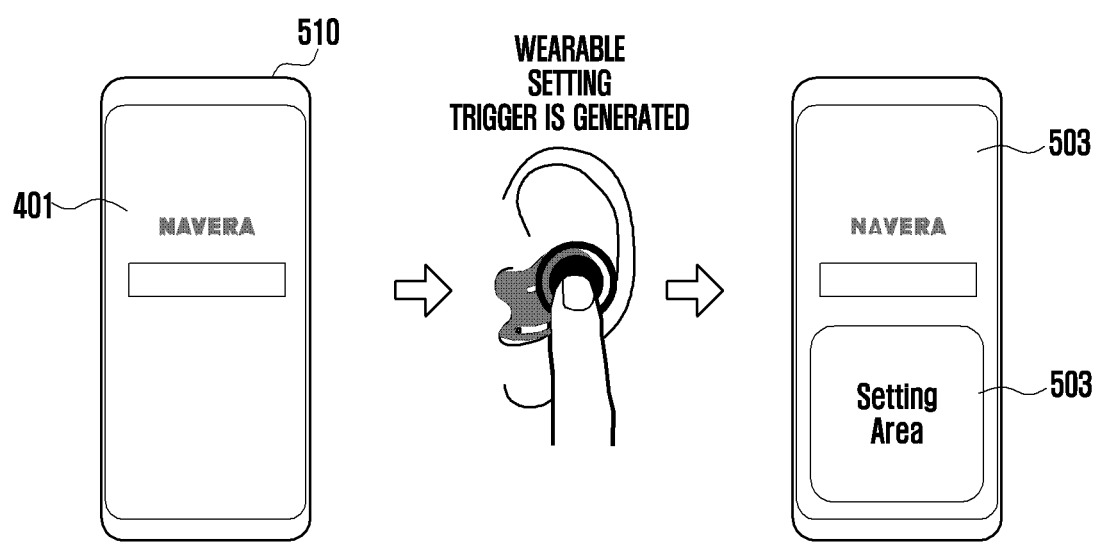
FIG. 5 illustrates an example of providing contents of an electronic device and contents of an external device on a display of the electronic device according to an embodiment of the disclosure.

FIG. 5 illustrates an example of providing contents of an electronic device and contents of an external device on a display of the electronic device according to an embodiment of the disclosure.

When an event is received from the external device 350, the processor 320 of the electronic device 300 may determine the content and display position of the second content considering the current state of the electronic device 300 and the relationship between the application being executed on the main display 501 and the external device 350. The event received from the external device 350 may include a context generated by the external device 350, and the context is the same as the context described above in FIG. 3.

According to an embodiment, when an application of the electronic device 300 includes visual information, the application may be executed on the main display 501.

Regarding the contents of the additional content, for example, the main content executed in the main display area 401 corresponds to an application that does not provide auditory information (e.g., an Internet application), and the external device 350 may correspond to an audio output device (e.g., earbuds or earphones). In addition, when an event occurs in relation to the external device 350 (e.g., failure detection of the audio output device, low battery of the audio output device), the processor 320 may determine the content related to the setting of the audio output device as the content of the additional content.

Regarding a location to display additional content, for example, the display 310 corresponds to an unexpanded first state 510. The processor 320 may recognize the state of the display 310, recognize that a screen related to an Internet application is currently displayed on the main display area 501, and maintain the state of the application and display being executed on the main display area 501. Thereafter, the processor 320 may display content related to the settings of the audio output device determined as additional content as a split screen or pop-up screen on the main display area 501. In this case, because additional content may be displayed on the main display area 503 without expanding separately while maintaining the content and display position of the main content, the user may be disturbed from enjoying the original content. However, the content of the additional content (e.g., failure detection of the audio output device, low battery of the audio output device) is a part that requires immediate notification to the user regardless of the main content, and may have the advantage of guiding the user to the corresponding information.

Figure 6:
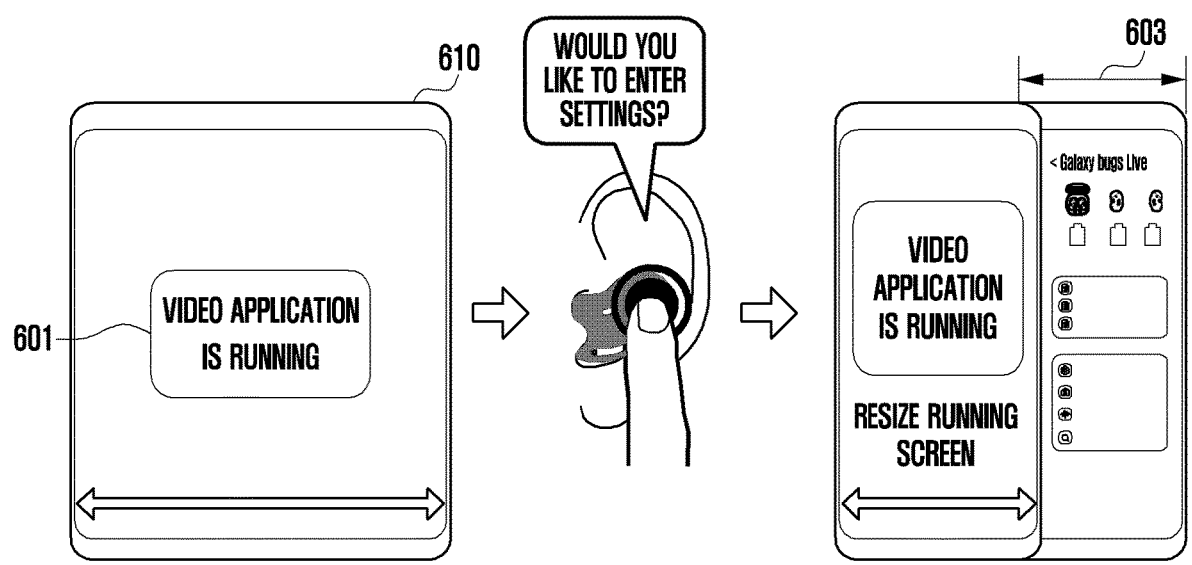
FIG. 6 illustrates an example of providing contents of an electronic device and contents of an external device on a display of the electronic device according to an embodiment of the disclosure.

FIG. 6 illustrates an example of providing contents of an electronic device and contents of an external device on a display of the electronic device according to an embodiment of the disclosure.

According to an embodiment, when an application of the electronic device 300 includes visual information, the application may be executed on the main display 601.

When an event is received from the external device 350, the processor 320 of the electronic device 300 may determine the content and display position of the second content considering the current state of the electronic device 300 and the relationship between the application being executed on the main display 401 and the external device 350. The event received from the external device 350 may include a context generated by the external device 350, and the context is the same as the context described above in FIG. 3.

Regarding the contents of the additional content, for example, the main content executed on the main display area 401 corresponds to a multimedia (e.g., a music, a game) application or video application including audio-visual information, and the external device 350 may correspond to an audio output device (e.g., earbuds or earphones). In this case, the processor 320 may determine the content related to the setting of the external device (audio output device) 350 as the content of the additional content.

Regarding a location to display additional content, for example, the display 310 corresponds to an expanded second state 610. The processor 320 may recognize the state of the display 310, and recognize that a screen related to a multimedia application or video application including audio-visual information is currently being displayed on the main display area 601. Thereafter, the processor 320 may display content related to the settings of the external device (audio output device) 350 determined as additional content on the expanded display area 603 in a split screen. In this case, because additional content may be displayed on the expanded area together with the main content, the user may conveniently receive additional content while continuing to enjoy a multimedia application or video application including audio-visual information being reproduced.

Figure 7:
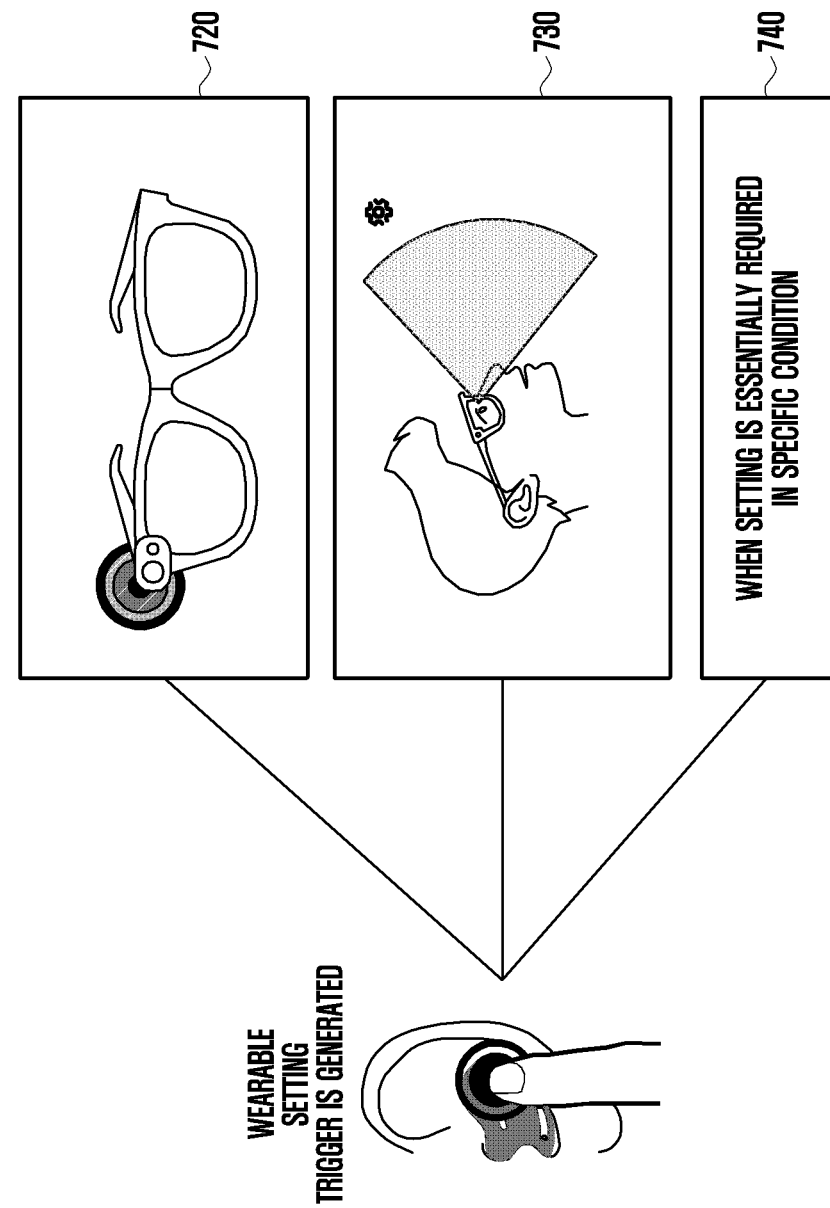
FIG. 7 illustrates operations for generating a trigger in an external device according to an embodiment of the disclosure.

FIG. 7 illustrates operations for generating a trigger in an external device according to an embodiment of the disclosure.

According to an embodiment, the fact that a user may transmit a trigger to the electronic device 300 via a touch input via the visually exposed physical button 315 of the external device 350, a force touch input, or the like is the same as described above with reference to FIG. 3.

According to another embodiment, a user may generate a trigger for setting the external device 350 by manipulating a visually exposed physical button of the external device 350 720. The manipulating the physical button may be classified according to the number, time, and strength of touch inputs, which may be determined in advance by the user.

According to yet another embodiment, the user may generate a trigger for setting the external device 350 by recognizing a visual direction or a gesture to the external device 350 730. The external device 350 may include a camera for recognizing the user's direction of vision and gesture, and may include, for example, an AR device. The AR device has a screen, but is difficult to control and relatively complicated to manipulate settings, but via the disclosure, the effect of relatively easy manipulation of settings may be obtained.

According to a further embodiment, when the processor of the external device 350 determines that setting is essential in a specific condition without user input, a trigger for setting the external device 350 may be generated 740. The specific condition in which the setting of the external device 350 is determined to be essential may include a case in which the external device 350 is used for an application running on the electronic device 300 and a case in which an error in the external device 350 is detected. The case in which an error in the external device 350 is detected may include, for example, a case in which one side of the audio device is not connected, a case in which there is a hardware defect, and a case in which the battery of the external device 350 is low and power saving is required.

Figure 8:
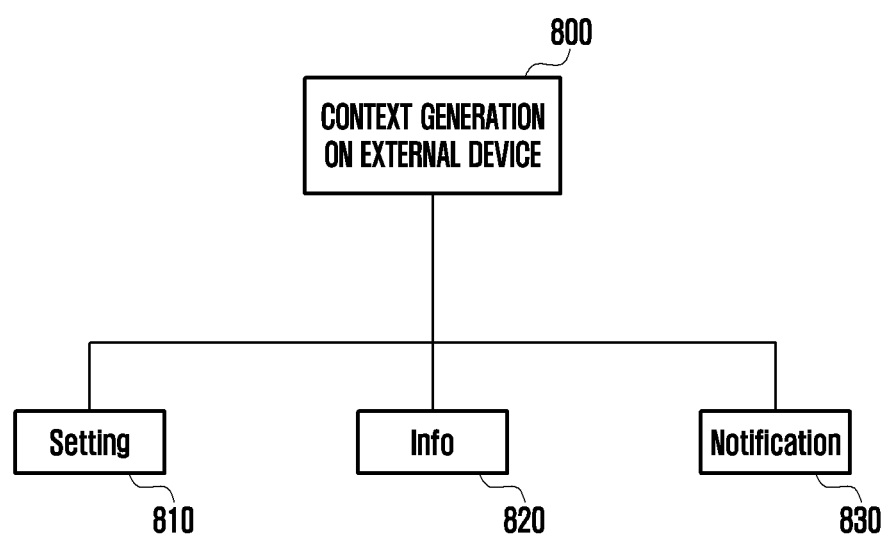
FIG. 8 illustrates types of contexts generated from an external device according to an embodiment of the disclosure.

FIG. 8 illustrates types of contexts generated from an external device according to an embodiment of the disclosure.

According to an embodiment, the external device 350 may generate a context. The context may include information constituting additional content to be displayed on the electronic device 300. The context generated by the external device 350 may be delivered to the processor 320 of the electronic device 300 via the communication module 330.

According to another embodiment, the processor 320 receive the context and determine the content and display position of the additional content by considering the relationship between the application being executed on the electronic device 300, the external device 350, and the context.

According to yet another embodiment, the context generated by the external device 350 may include a first context 810 including information related to settings of the external device 350, a second context 820 including information related to data collected by the external device, and a third context 830 related to new information unrelated to applications running on the electronic device, such as phone calls, text messages, notifications, and the like. The first context 810 may be expressed as Setting, the second context 820 as Info, and the third context 830 as Notification.

According to a further embodiment, the first context 810 may include information related to settings of the external device 350 considering the contents of the external device 350 and an application running on the electronic device 300. Additional content may be determined via the first context 810, and the user may conveniently change settings by receiving information related to settings.

According to still another embodiment, the second context 820 may include data collected by the external device 350. The external device 350 may collect data via sensors, and may process the collected data into graphs, equations, or pictures to make it easier for users to understand. The external device 350 may deliver processed data to the processor 320 of the electronic device 300 via the communication module 330. The processor 320 of the electronic device 300 may analyze the application running on the electronic device 300 and select suitable only from the received data. The processor 320 may display the selected data on the display 310 as additional content.

According to another embodiment, the third context 830 may include new context information such as phone calls, text messages, and notifications. The new context information may not be related to the contents of the application running on the electronic device 300. The processor 320 may recognize new context information and display the new context information using at least one of an expanded screen, a split screen, and a pop-up notification. During this process, the processor 320 may determine a display method so as not to interfere with the application running on the electronic device 300. When the new context information is related to the external device 350, the processor 320 may also display a screen related to the settings of the external device 350. The case in which the new context information is related to the external device 350 includes a case in which a function of the external device 350 is used to respond to a new context. For example, when the external device 350 includes an audio device and the new context information is a call, the processor 320 determines that the new context information is related to the external device 350.

Figure 9:
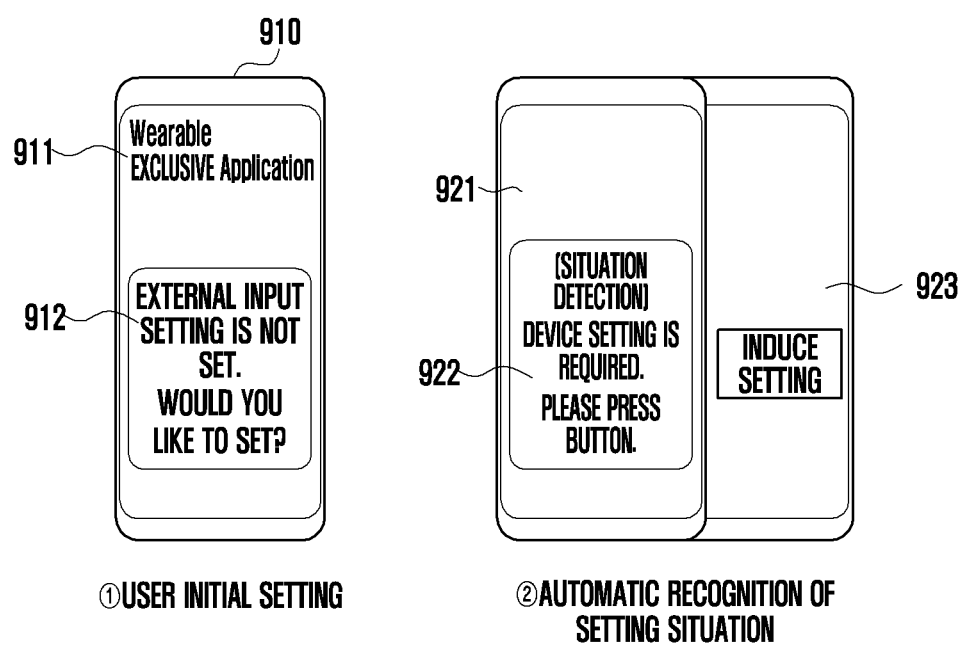
FIG. 9 illustrates an example of providing contents of an electronic device and a configuration screen of an external device on a display of the electronic device according to an embodiment of the disclosure.

FIG. 9 illustrates an example of providing contents of an electronic device and a configuration screen of an external device on a display of the electronic device according to an embodiment of the disclosure.

According to an embodiment, when the connection with the external device 350 is the first time, the processor 320 may suggest information for configuring a setting screen to the user via a pop-up, and may display a preconfigured setting screen as the additional content when the connection with the external device 350 is not the first time. Information to configure the setting screen may be related to the performance of the external device 350.

According to another embodiment, when the connection with the external device 350 is the first time 910, the processor 320 may display a pop-up screen 912 on a part of the main display area 911. The pop-up screen 912 may include content asking whether to set the external device 350. The user may identify whether the external device 350 is set via the pop-up screen 912, and proceed with setting via an expansion display area 923 when setting is required.

According to yet another embodiment, the processor 320 may determine a case in which setting is required even though the connection with the external device 350 is not the first time 910. The case where setting is required is the same as the case described above in FIG. 9.

According to a further embodiment, the processor 320 may display a setting screen on the expansion display area 923 when setting is required. The processor 320 may display a pop-up screen 922 on a main display area 921. The pop-up screen 922 may include content that setting is required and may induce setting to the user via a touch. When the user requests setting via the pop-up screen 922, setting is performed by using the expansion display area 923, so the content provided in the main display area 923 may be maintained as it is.

Figure 10:
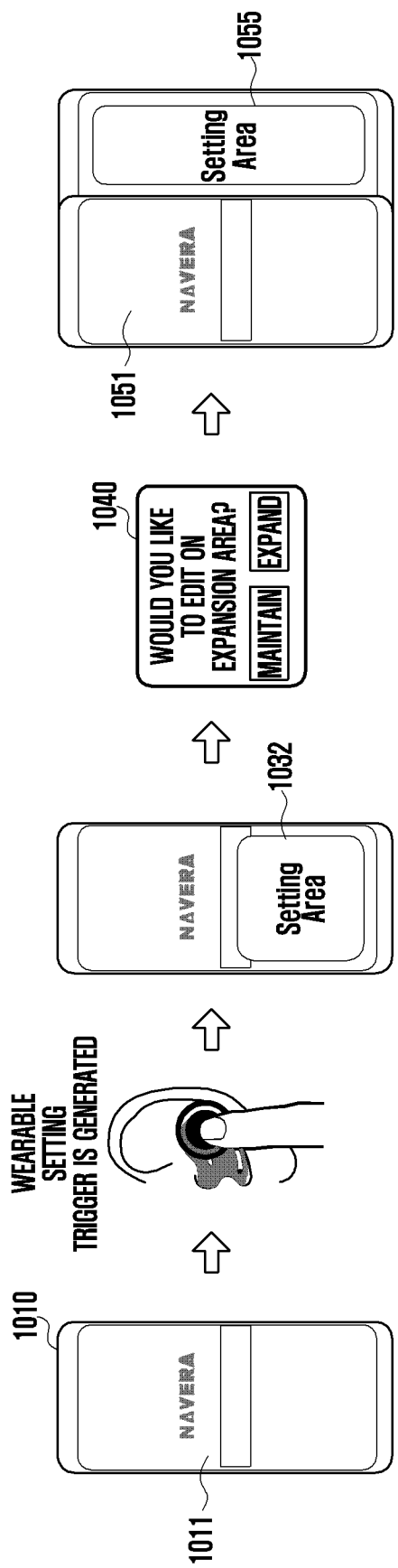
FIG. 10 illustrates an example of providing contents of an electronic device and a configuration screen of an external device on a display of the electronic device according to an embodiment of the disclosure.

FIG. 10 illustrates an example of providing contents of an electronic device and a configuration screen of an external device on a display of the electronic device according to an embodiment of the disclosure.

According to an embodiment, a location where additional content is displayed may include at least one of a partial area of the main display, an entire area of the main display, and at least one expansion display area. When an application running on the electronic device 300 includes only visual information, the processor 320 may display additional content on a partial area 1032 of the main display. The following description will be made on the assumption that the additional content is a setting screen of the external device 350, but the additional content is not limited thereto and may include the context 800 described above in FIG. 8.

According to another embodiment, the processor 320 may determine whether the application running on the electronic device 300 includes only visual information. When the application running on the electronic device 300 includes only visual information 1010, the contents of the application may be displayed on the main display area 1011.

According to yet another embodiment, a user may transmit a trigger to the electronic device 300 via a touch input via the visually exposed physical button 315 of the external device 350, a force touch input, or the like. The operation capable of transmitting the trigger has been described in detail with reference to FIG. 7. Upon receiving the trigger, the processor 320 of the electronic device 300 may display additional content related to the setting of the external device 350 on a partial area 1032 of the main display area while readjusting the screen of the application running on the main display area 1011.

According to a further embodiment, the processor 320 may display a notification 1040 on the partial area 1032 of the main display when the setting screen is displayed on the partial area 1032 of the main display. In this case, the notification 1040 may correspond to any form as long as the notification may indicate information to the user, and may include, for example, a pop-up screen or a split screen form. The notification 1040 may include content asking whether to proceed with setting the external device 350 by using an expansion display area 1055.

According to still another embodiment, the user may reply that the expansion display area 1055 is used via the notification 1040. Upon receiving such the reply, the processor 320 may expand at least one expansion display and display additional content related to the settings of the external device 350 on the expansion display area 1055. In this case, the processor 320 may display the application running on the electronic device 300 on the main display area 1051 again.

Figure 11:
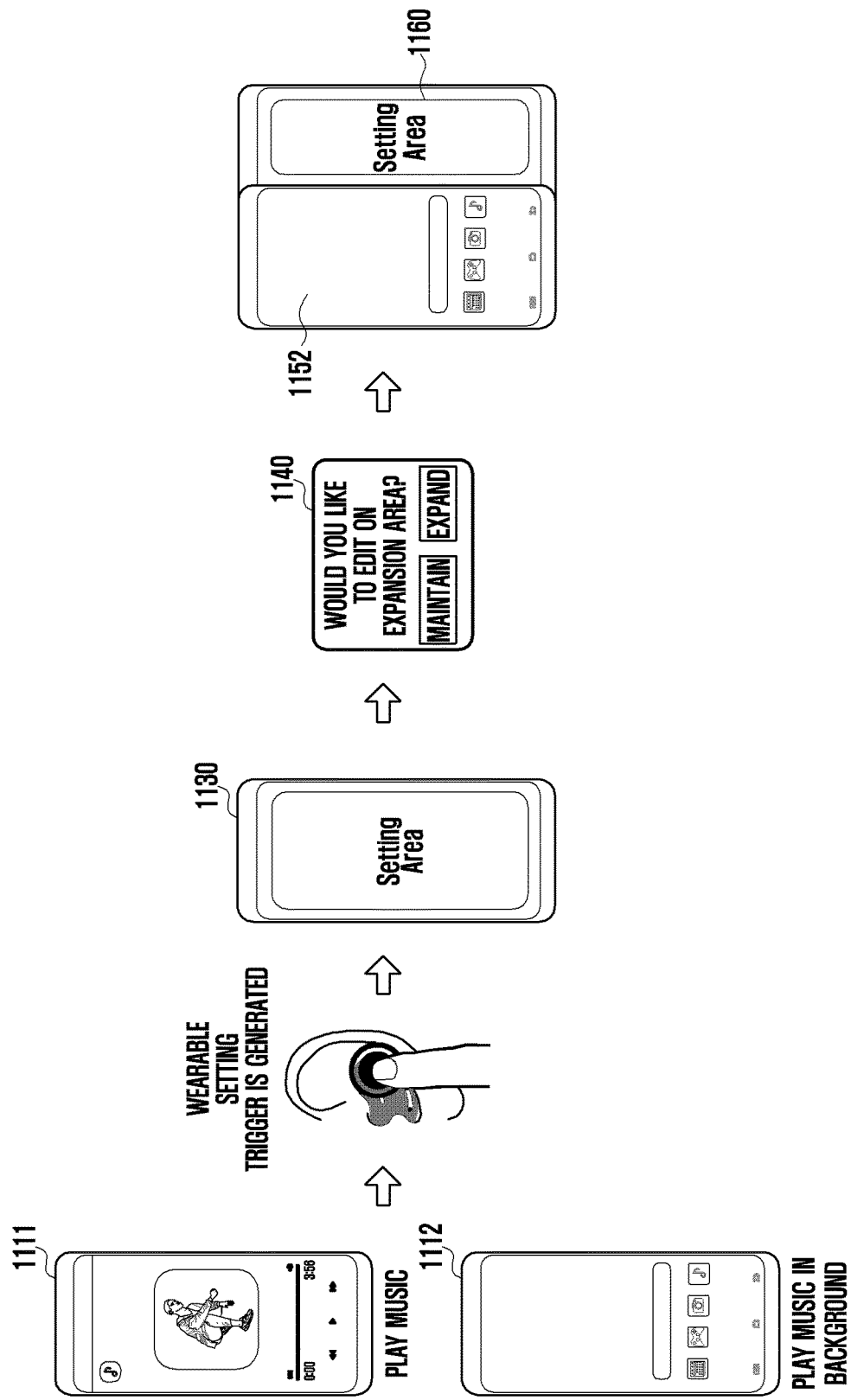
FIG. 11 illustrates an example of providing contents of an electronic device and a configuration screen of an external device on a display of the electronic device according to an embodiment of the disclosure.

FIG. 11 illustrates an example of providing contents of an electronic device and a configuration screen of an external device on a display of the electronic device according to an embodiment of the disclosure.

According to an embodiment, a location where additional content is displayed may include at least one of a partial area of the main display, an entire area of the main display, and at least one expansion display area. When an application running on the electronic device 300 does not include visual information, the processor 320 may display additional content on an entire area 1130 of the main display. The following description will be made on the assumption that the additional content is a setting screen of the external device 350, but the additional content is not limited thereto and may include the context 800 described above in FIG. 8.

According to another embodiment, the processor 320 may determine whether the application running on the electronic device 300 does not include visual information. When the application running on the electronic device 300 does not include visual information, the processor may display the contents of the application on the main display area 1111.

According to yet another embodiment, when the application running on the electronic device 300 does not include visual information, the processor 320 may execute the application in the background and display the home screen on the main display area 1112.

According to a further embodiment, a user may transmit a trigger to the electronic device 300 via a touch input via the visually exposed physical button 315 of the external device 350, a force touch input, or the like. The operation capable of transmitting the trigger has been described in detail with reference to FIG. 7. Upon receiving the trigger, the processor 320 of the electronic device 300 may display additional content related to the setting of the external device 350 on the entire area 1130 of the main display area while readjusting the screen of the main display area 1111 and 1112.

According to still another embodiment, the processor 320 may display a notification 1140 on the partial area of the main display when the setting screen is displayed on the entire area 1130 of the main display. In this case, the notification 1140 may correspond to any form as long as the notification may indicate information to the user, and may include, for example, a pop-up screen or a split screen form. The notification 1140 may include content asking whether to proceed with setting the external device 350 by using an expansion display area 1160.

According to yet another embodiment, the user may reply that the expansion display area 1160 is used via the notification 1140. Upon receiving such the reply, the processor 320 may expand at least one expansion display and display additional content related to the settings of the external device 350 on the expansion display area 1160. In this case, the processor 320 may display the application running on the electronic device 300 or the home screen on the main display area 1152 again.

Figure 12:
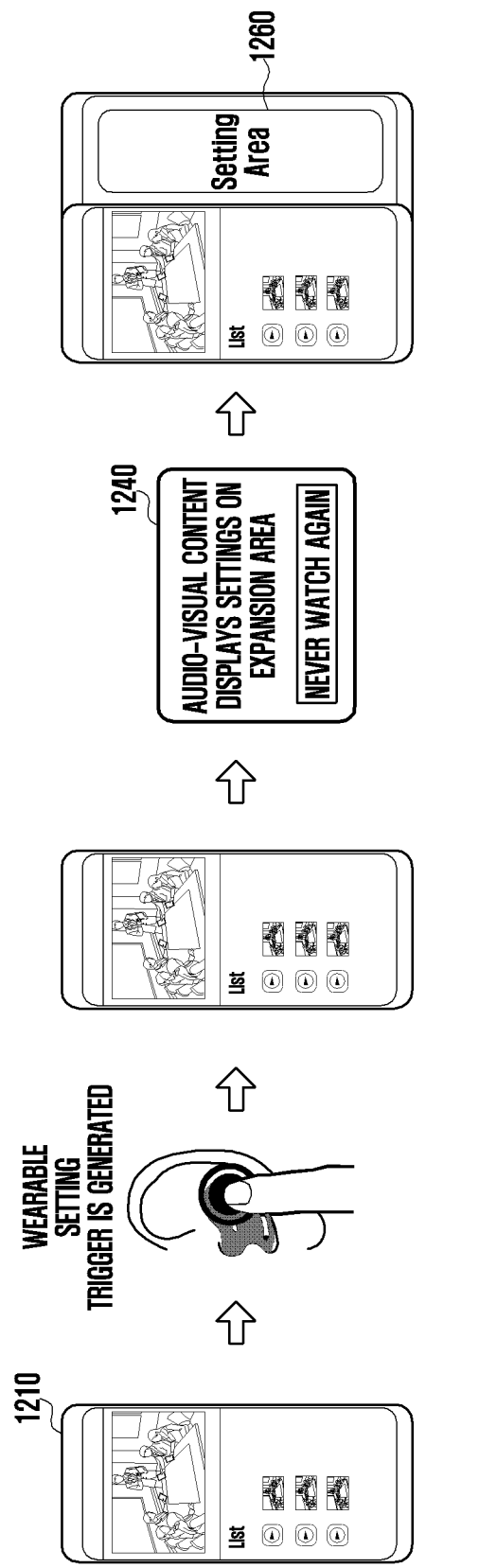
FIG. 12 illustrates an example of providing contents of an electronic device and a configuration screen of an external device on a display of the electronic device according to an embodiment of the disclosure.

FIG. 12 illustrates an example of providing contents of an electronic device and a configuration screen of an external device on a display of the electronic device according to an embodiment of the disclosure.

According to an embodiment, a location where additional content is displayed may include at least one of a partial area of the main display, an entire area of the main display, and at least one expansion display area. When an application running on the electronic device 300 does not include visual information, the processor 320 may display additional content on an entire area 1130 of the main display. The following description will be made on the assumption that the additional content is a setting screen of the external device 350, but the additional content is not limited thereto and may include the context 800 described above in FIG. 8.

According to another embodiment, the processor 320 may determine whether the application running on the electronic device 300 includes both visual information and auditory information. When the application running on the electronic device 300 includes both the visual information and the auditory information, the processor 320 may display the contents of the application on the main display area 1210.

According to yet another embodiment, a user may transmit a trigger to the electronic device 300 via a touch input via the visually exposed physical button 315 of the external device 350, a force touch input, or the like. The operation capable of transmitting the trigger has been described in detail with reference to FIG. 7. Upon receiving the trigger, the processor 320 of the electronic device 300 may expand at least one expanded display and display additional content related to settings of the external device 350 on an expansion display area 1260.

According to a further embodiment, the processor 320 may display a notification 1240 on the partial area of the main display. In this case, the notification 1140 may correspond to any form as long as the notification may indicate information to the user, and may include, for example, a pop-up screen or a split screen form. The notification 1140 may include content asking whether to proceed with setting the external device 350 by using an expansion display area 1260. The notification 1140 may further include asking the user whether to continuously display the notification 1140.

Figure 13:
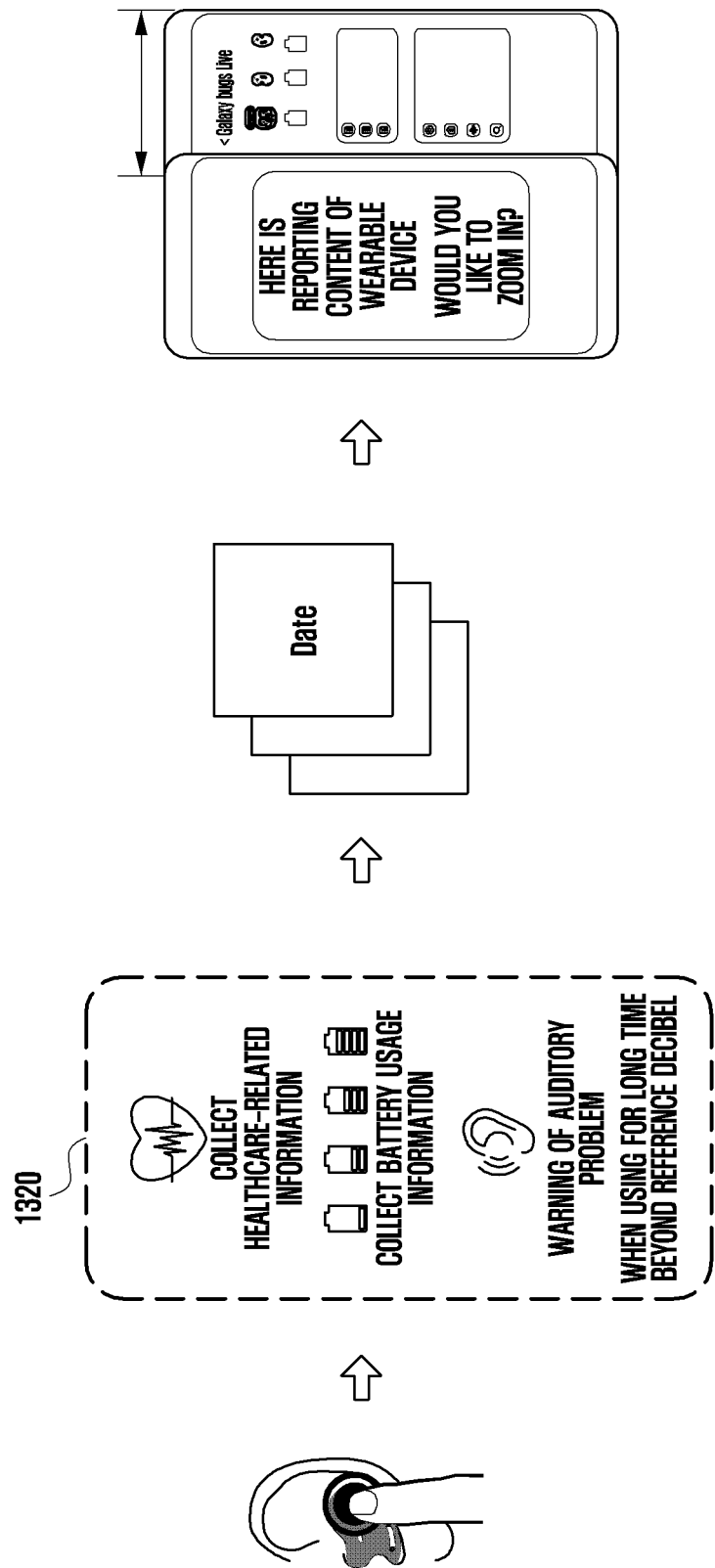
FIG. 13 illustrates an example of providing data of an external device and a configuration screen of an external device on a display of the electronic device according to an embodiment of the disclosure.

FIG. 13 illustrates an example of providing data of an external device and a configuration screen of an external device on a display of the electronic device according to an embodiment of the disclosure.

According to an embodiment, a user may transmit a trigger to the electronic device 300 via a touch input via the visually exposed physical button 315 of the external device 350, a force touch input, or the like. The operation capable of transmitting the trigger has been described in detail with reference to FIG. 7. Upon receiving the trigger, the processor 320 of the electronic device 300 may expand at least one expanded display and display additional content related to settings of the external device 350 on an expansion display area.

According to another embodiment, the fact that the context generated by the external device 350 may include a first context 810 including information related to settings of the external device 350, a second context 820 including information related to data collected by the external device, and a third context 830 related to new information unrelated to applications running on the electronic device, such as phone calls, text messages, notifications, and the like, has been described in FIG. 8.

According to yet another embodiment, the additional content may include information on the first to third contexts. The processor 320 may determine information to be displayed as the additional content from among the first context and the second context according to the type of application executed on the electronic device 300.

According to a further embodiment, the external device 350 may include an audio device. Applications executed on the electronic device 300 may be related to exercise. The processor 320 may determine that an application running on the electronic device 300 is related to exercise.

According to still another embodiment, the processor 320 may warn the user of a hearing problem when the user uses the device for a long time beyond a reference value 1320. In this case, the processor 320 may display an audio device setting screen related to the first context on the expansion display area. In this case, the processor 320 may also display information related to the battery of the external device 350 on the expansion display area.

According to yet another embodiment, the external device 350 may collect health-related information and provide the same to the processor 320 of the electronic device 300. The processor 320 may determine the heart rate-related information as additional content considering a relationship between the application running on the electronic device 300, the external device 350, and the second context (Information related to health) transmitted from the external device 350. In this case, the processor 320 may display a notification asking whether to display the heart rate-related information on the main display area. When the user selects to display information via a notification, the processor 320 may display the heart rate-related information on the main display.

Figure 14:
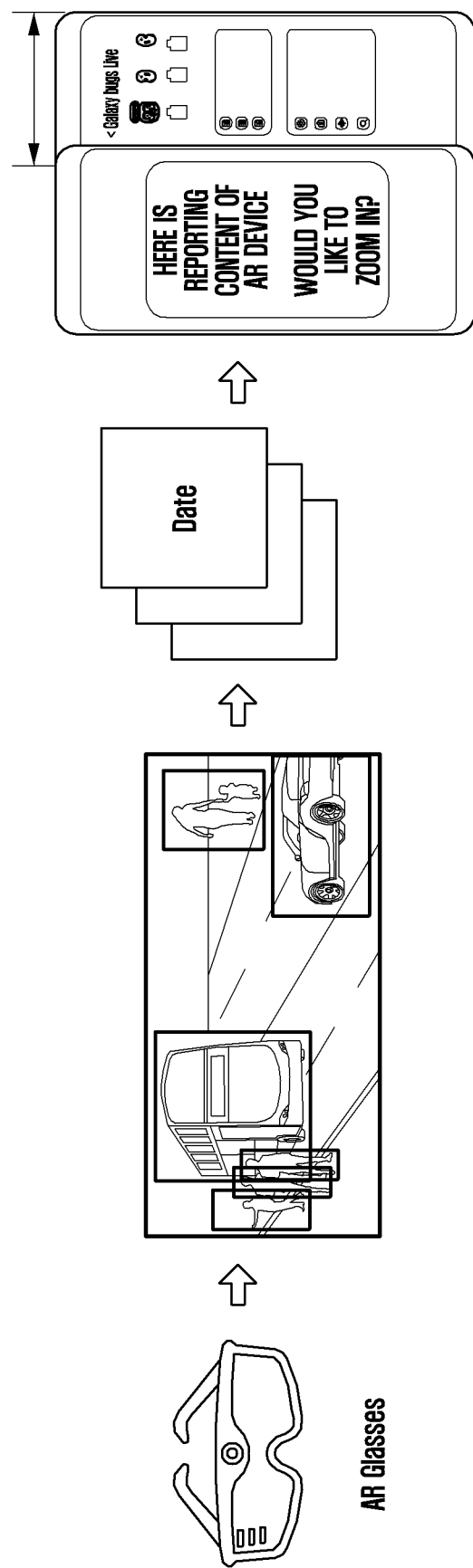
FIG. 14 illustrates an example of providing data of an external device and a configuration screen of an external device on a display of the electronic device according to an embodiment of the disclosure.

FIG. 14 illustrates an example of providing data of an external device and a configuration screen of an external device on a display of the electronic device according to an embodiment of the disclosure.

According to an embodiment, a user may generate a trigger for setting the external device 350 by manipulating a visually exposed physical button of the external device 350 720. The fact that manipulating the physical button may be classified according to the number, time, and strength of touch inputs, which may be determined in advance by the user, has been described above in FIG. 7.

According to another embodiment, a user may transmit a trigger to the electronic device 300 via a touch input via the visually exposed physical button 315 of the external device 350, a force touch input, or the like. The operation capable of transmitting the trigger has been described in detail with reference to FIG. 7. Upon receiving the trigger, the processor 320 of the electronic device 300 may expand at least one expanded display and display additional content related to settings of the external device 350 on an expansion display area.

According to yet another embodiment, the fact that the context generated by the external device 350 may include a first context 810 including information related to settings of the external device 350, a second context 820 including information related to data collected by the external device, and a third context 830 related to new information unrelated to applications running on the electronic device, such as phone calls, text messages, notifications, and the like, has been described in FIG. 8.

According to still another embodiment, the additional content may include information on the first to third contexts. The processor 320 may determine information to be displayed as the additional content from among the first context and the second context according to the type of application executed on the electronic device 300.

According to a further embodiment, the external device 350 may include an AR device having a camera. In addition, an application executed on the electronic device 300 may be related to AR glasses.

According to yet another embodiment, the external device 350 may collect information collected by using the AR glasses or information extracted by analyzing the AR glasses and transmit the collected information to the processor 320 of the electronic device 300. The processor 320 may determine related information (e.g., pre-determined object information, point of interest (POI) information recorded while walking, vehicle information collected while moving, danger information around while moving, and coupon information related to nearby stores) as additional content considering the relationship between the application running on the electronic device 300, the external device 350, and the second context (information collected by using AR Glasses) transmitted from the external device 350. In this case, the processor 320 may display the notification asking whether to display the collected information by using the AR Glasses on the main display area. When the user selects to display information via the notification, the processor 320 may display related information on the main display.

According to yet another embodiment, the external device 350 may collect information collected during use and provide the information to the processor 320 of the electronic device 300. The processor 320 may transmit object information (e.g., display when moving over a specified distance, and display when consuming more than a specified number of calories) previously defined by the user or information collected by the external device 350 itself considering the relationship between the application running on the electronic device 300, the external device 350, and the second context transmitted from the external device 350.

FIG. 15 illustrates an example of providing contents of an electronic device and contents of an external device on a display of the electronic device according to an embodiment of the disclosure.

According to an embodiment, the fact that the context generated by the external device 350 may include a first context 810 including information related to settings of the external device 350, a second context 820 including information related to data collected by the external device, and a third context 830 related to new information unrelated to applications running on the electronic device, such as phone calls, text messages, notifications, and the like, has been described in FIG. 8.

According to another embodiment, the additional content may include information on the first to third contexts. The processor 320 may determine information to be displayed as the additional content from among the first context and the second context according to the type of application executed on the electronic device 300.

According to yet another embodiment, the external device 350 may include a wearable device. The application executed on the electronic device 300 may be related to exercise. The processor 320 may determine that the application running on the electronic device 300 is related to exercise.

According to a further embodiment, the external device 350 may collect exercise-related information and provide the information to the processor 320 of the electronic device 300. The processor 320 may determine related information as additional content considering the relationship between the application running on the electronic device 300, the external device 350, and the second context (exercise-related information) transmitted from the external device 350. In this case, the related information may include, for example, exercise time, speed, moving distance, heart rate, and a graph illustrating exercise intensity over time. Even though not directly related to exercise, the processor 320 may determine sleep information, weather pressure information, water intake information, life pattern information, and battery information as the additional content together. The additional content is not limited thereto, and may correspond to the application running on the electronic device 300, the external device 350, and the second context transmitted from the external device 350.

According to still another embodiment, the processor 320 may display the contents of an application running on the electronic device 300 on a main display area 1520. The processor 320 may display additional content on an expansion display area 1522 upon detecting that the exercise is being performed or that the exercise is all over. In this case, the additional content may include exercise time, speed, and distance information 1523, heart rate information 1524, and exercise pace information 1525, but is not limited thereto.

According to an embodiment, the additional content may be displayed in the form of a pop-up window or a split screen, and the form of the additional content may include icons, graphs, photos, pictures, texts, text to speech (TTS), and the like.

Figure 16:
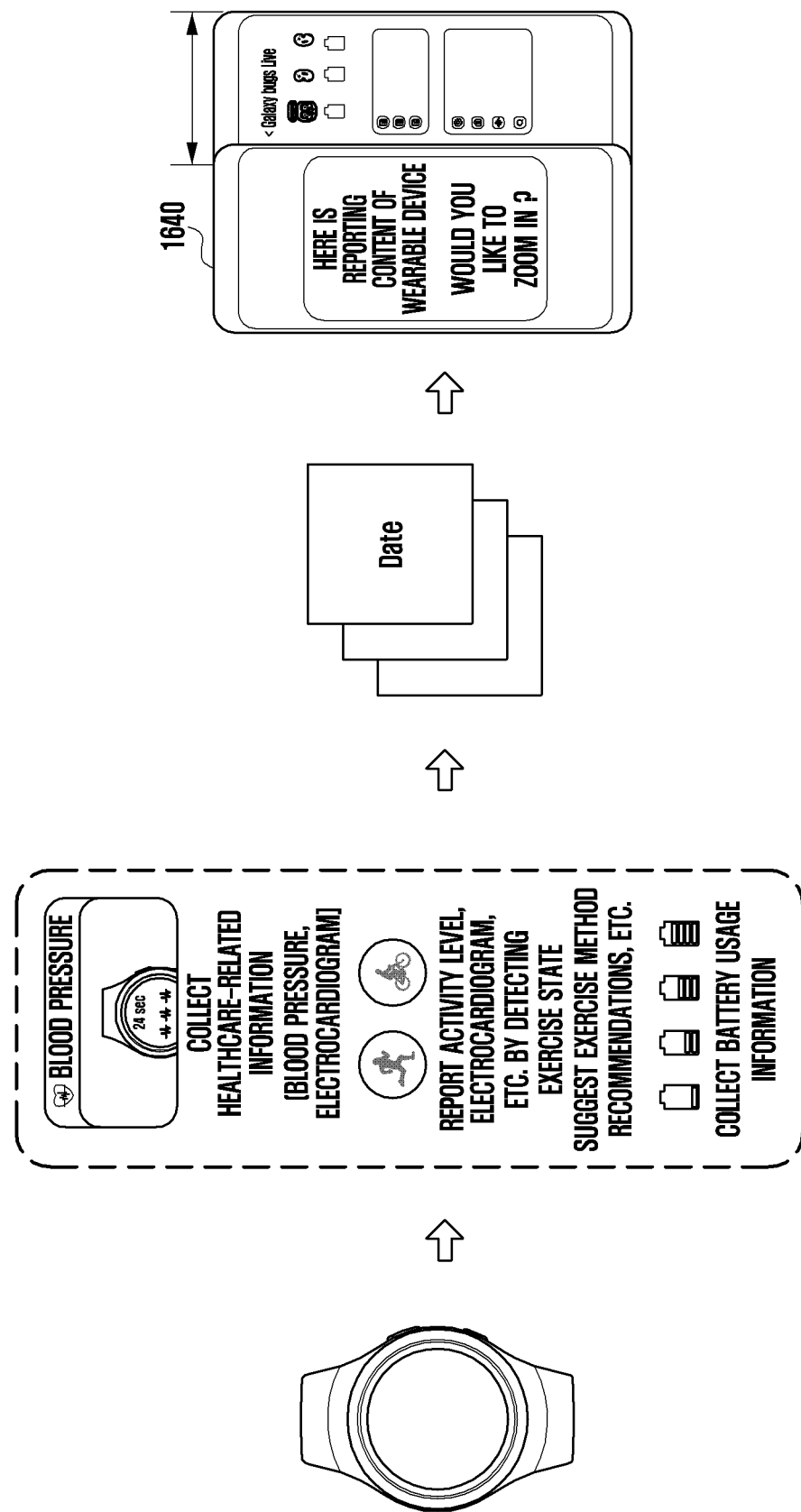
FIG. 16 illustrates an example of providing contents of an electronic device and contents of an external device on a display of the electronic device according to an embodiment of the disclosure.

FIG. 16 illustrates an example of providing contents of an electronic device and contents of an external device on a display of the electronic device according to an embodiment of the disclosure.

According to an embodiment, the fact that the context generated by the external device 350 may include a first context 810 including information related to settings of the external device 350, a second context 820 including information related to data collected by the external device, and a third context 830 related to new information unrelated to applications running on the electronic device, such as phone calls, text messages, notifications, and the like, has been described in FIG. 8.

According to an embodiment, the additional content may include information on the first to third contexts. The processor 320 may determine information to be displayed as the additional content from among the first context and the second context according to the type of application executed on the electronic device 300.

According to another embodiment, the external device 350 may include a wearable device. The application executed on the electronic device 300 may be related to exercise. The processor 320 may determine that the application running on the electronic device 300 is related to exercise.

According to yet another embodiment, the processor 320 may determine battery usage information transmitted from the external device 350 as additional content. In this case, the processor 320 may display the setting screen of the wearable device related to the first context on the expansion display area. In this case, the processor 320 may also display information related to the battery of the external device 350 on the expansion display area 1640.

According to still another embodiment, the external device 350 may collect health-related information and provide the information to the processor 320 of the electronic device 300. The processor 320 may determine information related to blood pressure, activity level, electrocardiogram, and exercise methods as additional content considering the relationship between the application running on the electronic device 300, the external device 350, and the second context (health-related information) transmitted from the external device 350. In this case, the processor 320 may display a notification asking whether to display exercise-related information on the main display area. When the user selects to display information via the notification, the processor 320 may display information related to blood pressure, activity level, electrocardiogram, and exercise method on the main display.

Figure 17:
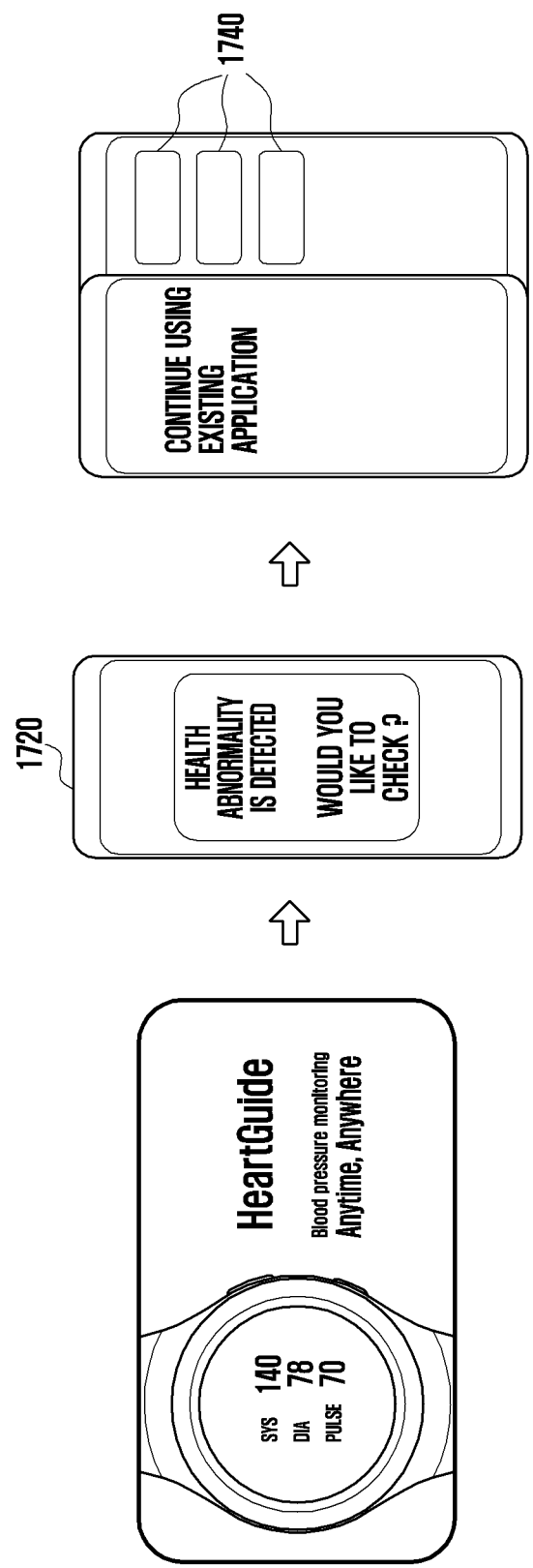
FIG. 17 illustrates an example of displaying contents of an electronic device and a setting screen of an external device on a display of the electronic device according to an embodiment of the disclosure.

FIG. 17 illustrates an example of displaying contents of an electronic device and a setting screen of an external device on a display of the electronic device according to an embodiment of the disclosure.

According to an embodiment, health-related information may be monitored via the external device 350. The health-related information of a user of the external device 350 may be monitored and may be detected when the monitored value is out of a preset reference value. The processor 320 of the electronic device 300 may receive the health-related information from the external device 350, and display a health abnormality notification on the main display area of the electronic device 300 when out of the reference value 1720. When the user indicates an intention to confirm this, the processor 320 may display the additional content on the expansion display area 1740.

According to another embodiment, the additional content may include, but is not limited to, re-measurement of health abnormality data, an action method for health abnormality, and initialization of a health state measuring sensor. The processor 320 may synthesize health information on the user from the external device 350 and suggest a method of action for a health abnormality.

Figure 18:
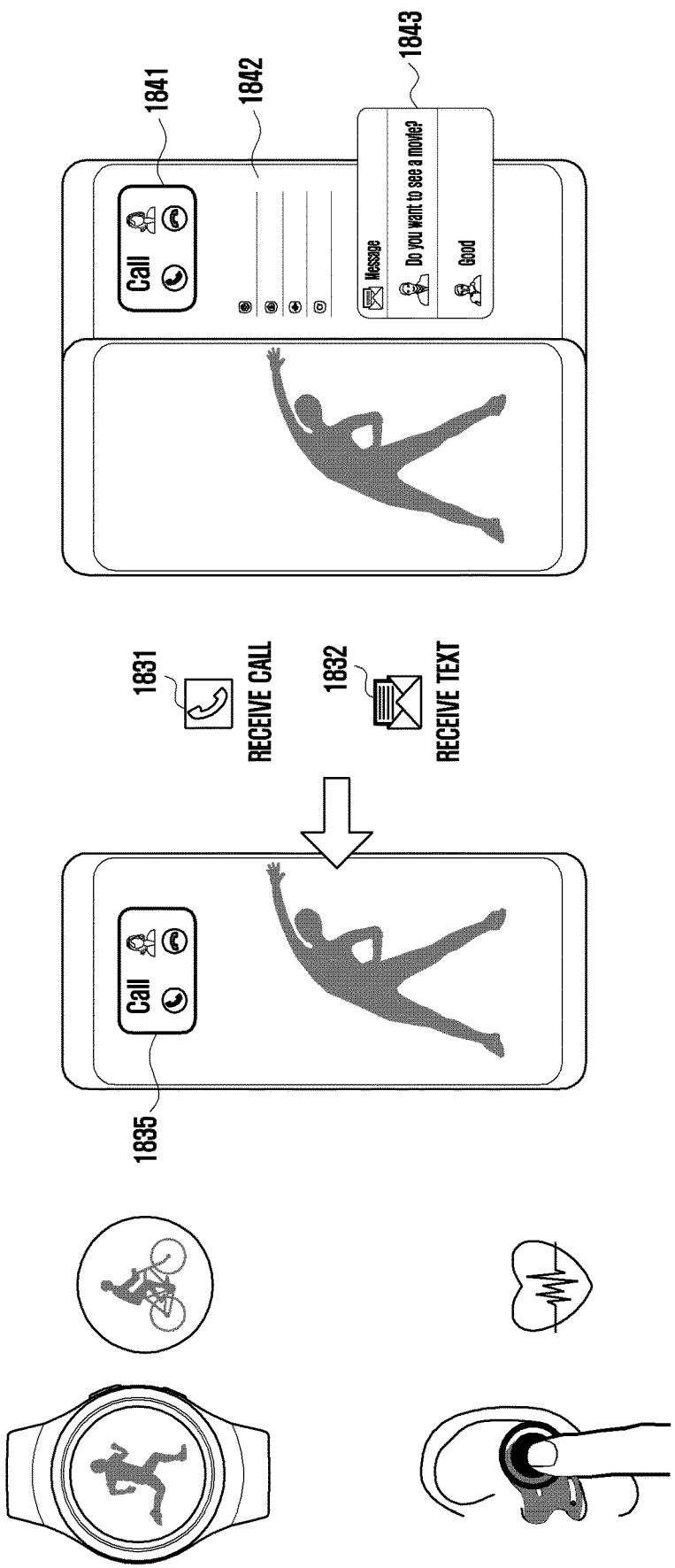

FIG. 18 illustrates an example of displaying contents of an electronic device and a notification screen for a new situation on a display of the electronic device according to an embodiment of the disclosure.

According to various embodiments, the external device 350 may generate a context. The context may include information constituting additional content to be displayed on the electronic device 300. The context generated by the external device 350 may be delivered to the processor 320 of the electronic device 300 via the communication module 330.

According to various embodiments, the processor 320 receive the context and determine the content and display position of the additional content by considering the relationship between the application being executed on the electronic device 300, the external device 350, and the context.

According to another embodiment, the context generated by the external device 350 may include a first context 810 including information related to settings of the external device 350, a second context 820 including information related to data collected by the external device, and a third context 830 related to new information unrelated to applications running on the electronic device, such as phone calls, text messages, notifications, and the like.

According to an embodiment, the additional content may include information on the first to third contexts. The processor 320 may recognize when a call, a text, a notification, and the like are generated on the electronic device 300. In this situation, when the electronic device 300 is used, the processor 320 may determine information to be displayed as the additional content from among the first context and the third context.

According to an embodiment, when a new event is generated on the electronic device 300, the processor 320 may determine whether the external device 350 is used for the new event. When a new event, in which the external device 350 is not used, is generated on the electronic device 300, the processor 320 may display a notification screen 1835 for the new event on a partial area of the main display. The new event may include, but is not limited to, receiving a call 1831 or receiving a text 1832.

According to an embodiment, when the external device 350 is used for a new event, for example, the external device 350 includes an audio device and the new event may include a phone call. In this case, the processor 320 may expand at least one expansion display area. The processor 320 may display a notification screen 1841 for receiving a call on a part of the expansion display area. The processor 320 may display a setting screen 1842 of the external device 350 on a part of the expansion display area.

According to an embodiment, when a new event corresponding to receiving a text 1832 is additionally generated, the processor 320 may recognize the event. In this case, the processor 320 may display a text message notification screen 1843 along with the call reception notification screen 1841 and the setting screen 1842 of the external device 350 on a part of the expansion display area.

An electronic device according to various embodiments may include a display including a main display area and at least one expansion display area expandable from the main display area, a communication module, and a processor operatively connected to the display and the communication module, wherein the processor is configured to execute an application of the electronic device in a first state in which the display is not expanded or in a second state in which the display is expanded to display a first content on the display, establish a connection with an external device via the communication module, receive a context generated from the external device, determine a position to display a second content related to the context, from among the main display area or the at least one expansion display area based on the first content and whether the display is in the first state or the second state when the context is received, and display the second content at the determined position.

According to various embodiments, the processor may display the second content on a partial area of the main display when the application of the electronic device includes only visual information, display the second content on the entire area of the main display when the application of the electronic device is running in the background, and expand the at least one expansion display area and display the second content on the expanded display area when the application of the electronic device includes both visual information and auditory information.

According to various embodiments, the processor, when receiving the context in the first state, may display the first content on a first area of the main display area, and display the second content in a second area.

According to various embodiments, the processor, when receiving the context in the first state, may display the first content on the entire main display area, and display the second content on a part of the main display area as a pop-up window.

According to various embodiments, the processor, when receiving the context in the first state, may expand the display, display the first content on the main display area, and display the second content on the expansion display area.

According to various embodiments, the processor, when receiving the context in the second state, may display a first content on the main display area, and display a second content on the expansion display area.

According to various embodiments, the external device may include a wearable device.

According to various embodiments, the context generated from the external device may include at least one of a first context including information related to settings of the external device, a second context including information related to the data collected by the external device, and a third context including event information generated from the outside that is not related to the application running on the electronic device, and the processor may determine a first context and a second context as a second content when the external device is used to execute the first content, determine a first context as a second content when the external device is not used to execute the first content, and determine a third context as a second content when detecting an external event that is not related to the first content.

According to various embodiments, the display may include at least one expansion display area that is expandable from the main display area to at least one of up, down, left, and right directions.

According to various embodiments, the display may be expanded via a sliding method.

According to various embodiments, the processor may display a notification on a part of the main display area when the second content is displayed by using the main display area, and the notification may include information guiding the use of the expansion display area to display the second content.

According to various embodiments, the processor may display a pop-up for configuring information to configure a setting screen when the connection with the external device is the first time, and display a preconfigured setting screen as the second content when the connection with the external device is not the first time.

Figure 19:
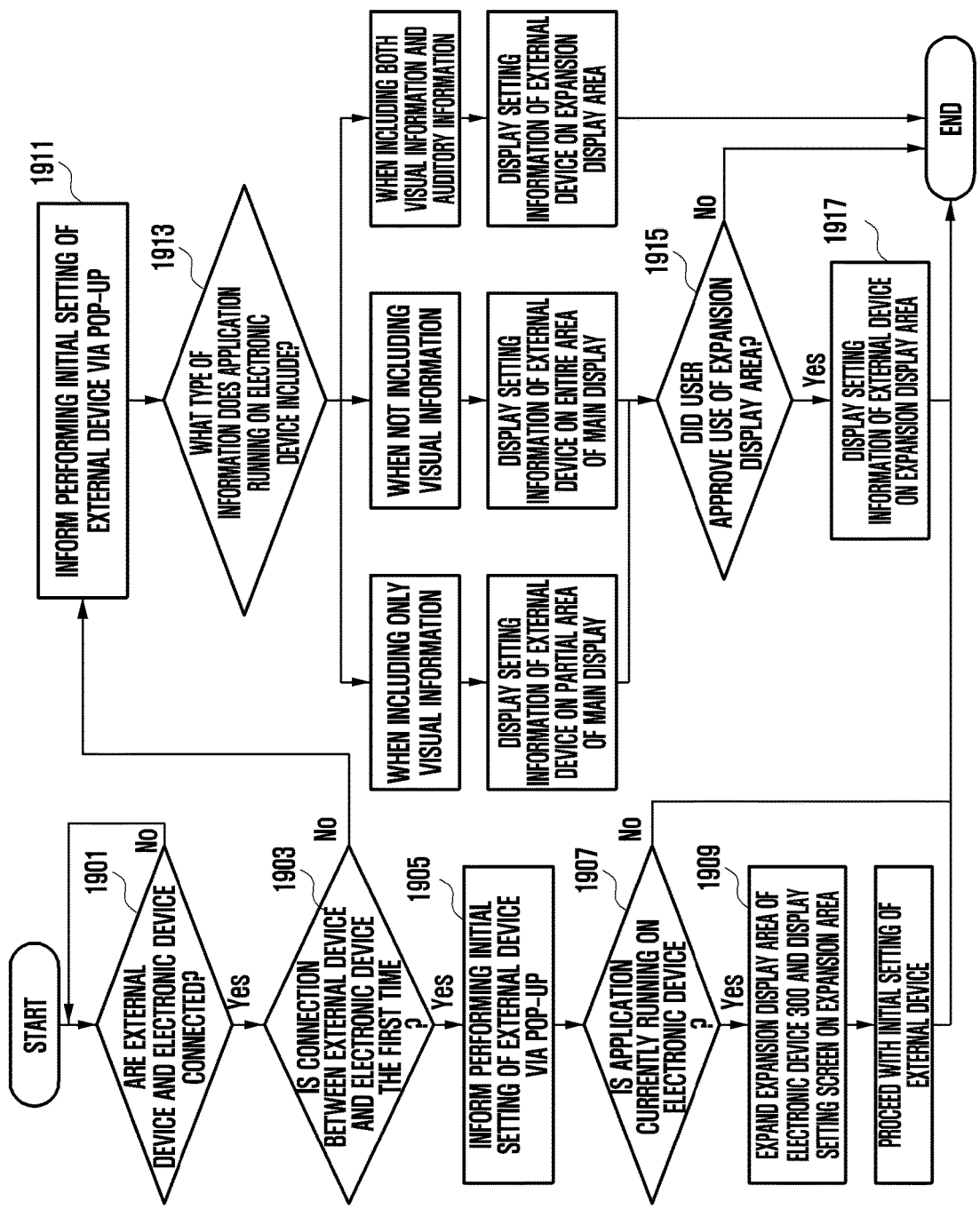
FIG. 19 is a flowchart of a method for providing contents of an electronic device according to an embodiment of the disclosure.

FIG. 19 is a flowchart of a method for providing contents of an electronic device according to an embodiment of the disclosure.

The illustrated method may be performed by the electronic device described above with reference to FIGS. 1, 2A to 2D, and 3 to 18, and descriptions of the technical features described above will be omitted hereinafter.

According to various embodiments, in operation 1901, the processor 320 of the electronic device 300 may determine whether the external device 350 and the electronic device 300 are connected.

According to various embodiments, in operation 1903, when the external device 350 and the electronic device 300 are connected, the processor 320 may determine whether the connection between the external device 350 and the electronic device 300 is the first time. In operation 1905, when the external device 350 and the electronic device 300 are connected for the first time, the processor 320 may inform a user that the initial setting of the external device 350 will be performed via a pop-up screen. The user may proceed with the setting according to his/her situation and preference.

According to various embodiments, in operation 1907, the processor 320 may determine whether an application is running on the electronic device 300. In operation 1909, when the application is running on the electronic device 300, the processor 320 may expand at least one expansion display area of the electronic device 300 and display a setting screen of the external device 350 on the expansion area. Via this, the user may proceed with the initial setting of the external device.

According to various embodiments, in operation 1903, when the connection between the external device 350 and the electronic device 300 is not the first time, a context generated by the external device 350 may be received (operation 1911). According to an embodiment, the fact that the context generated by the external device 350 may include a first context 810 including information related to settings of the external device 350, a second context 820 including information related to data collected by the external device, and a third context 830 related to new information unrelated to applications running on the electronic device, such as phone calls, text messages, notifications, and the like, is the same as described above with reference to FIG. 8.

According to various embodiments, in operation 1913, the processor 320 may determine what type of information the application running on the electronic device 300 includes. In this case, the form of application information may be classified into a case of including only visual information, a case of not including visual information, and a case of including both visual and auditory information. According to an embodiment, when the application of the electronic device 300 includes only visual information, the processor 320 may display setting information of the external device 350 on a partial area of the main display, when the application of the electronic device 300 does not include visual information, the processor 320 may display the setting information of the external device 350 on the entire area of the main display, and when the application of the electronic device 300 includes both visual information and auditory information, the processor 320 may expand at least one expansion display area and display setting information of the external device 350 on the expansion display area.

According to various embodiments, in operation 1915, when the application of the electronic device 300 includes only visual information or does not include visual information, the processor 320 may display a notification asking the user whether to use the expansion display area on a part of the main display area.

According to various embodiments, in operation 1917, when the user approves the use of the expansion display area of the electronic device 300, the processor 320 may display setting information of the external device 350 on the expansion display area.

A method of providing contents of an electronic device according to various embodiment may include identifying whether an external device is operatively connected to the electronic device, receiving a context generated from the external device, determining a second content to be added to the display considering a type of first content including application information running on the electronic device, and the external device, and selecting where to display the second content on the display based on a first content including application information running on the electronic device and whether the display is in a first state in which the display is unexpanded or a second state in which the display is expanded.

According to various embodiments, the selecting where to display the second content on the display may include displaying the second content on a partial area of the main display when the application of the electronic device includes only visual information, displaying the second content on the entire area of the main display when the application of the electronic device is running in the background, or expanding the at least one expansion display area and display the second content on the expanded display area when the application of the electronic device includes both visual information and auditory information.

According to various embodiments, the selecting where to display the second content on the display, when receiving the context in the first state, may include displaying the first content on a first area of the main display area, and displaying the second content on a second area.

According to various embodiments, the selecting where to display the second content on the display, when receiving the context in the first state, may include displaying the first content on the entire main display area, and displaying the second content on a part of the main display area as a pop-up window.

According to various embodiments, the selecting where to display the second content on the display, when receiving the context in the first state, may include expanding the display, displaying the first content on the main display area, and displaying the second content on the expansion display area, and the expansion display may be expanded by using a sliding manner.

According to various embodiments, the selecting where to display the second content on the display, when receiving the context in the second state, may include displaying a first content on the main display area, and displaying a second content on the expansion display area.

According to various embodiments, the context generated from the external device may include at least one of a first context including information related to settings of the external device, a second context including information related to the data collected by the external device, and a third context including event information generated from the outside that is not related to the application running on the electronic device, and the selecting where to display the second content on the display may include determining a first context and a second context as a second content by the processor when the external device is used to execute the first content, or determining a first context as a second content by the processor when the external device is not used to execute the first content, or determining a third context as a second content by the processor when detecting an external event that is not related to the first content.

According to various embodiments, the identifying whether an external device is operatively connected to the electronic device may include identifying whether the connection with the external device is the first time, displaying a pop-up for configuring information to configure a setting screen when the connection with the external device is the first time, or displaying a preconfigured setting screen as the second content when the connection with the external device is not the first time.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing including a first housing part and a second housing part configured to movably engage with the first housing part between a first state and a second state of the electronic device;
   a flexible display coupled to the first housing part and the second housing part such that a size of an area of the flexible display that is visible from a front side of the housing changes as the housing is moved between the first state and the second state, wherein the first state is a state in which the size of the area of the flexible display that is visible from a front side of the housing is less than a specified size, and the second state is a state in which the size of the area of the flexible display that is visible from a front side of the housing is more than the specified size;
   communication circuitry configured to establish a connection with an external device;
   at least one processor; and
   memory storing instructions which, when executed by the at least one processor, cause the electronic device to:
      display a first content of an application, on the flexible display,
      receive a context generated by the external device,
      generate a second content based on the received context and the first content,
      determine a position to display the second content based on whether the electronic device is in the first state or the second state, and
      display the second content at the determined position.

2. The electronic device of claim 1, wherein the instructions, when executed by the at least one processor, further cause the electronic device to:
   display the second content on a partial area of a flexible display area exposed to the outside of the housing in case that the application of the electronic device comprises only visual information,
   display the second content on an entire area of the flexible display area exposed to the outside of the housing in case that the application of the electronic device is running in a background,
   increase the area where the flexible display is exposed out of the housing, in case that the application of the electronic device comprises both visual information and auditory information, and
   display the second content on an increased area.

3. The electronic device of claim 1, wherein the instructions, when executed by the at least one processor, further cause the electronic device to, in case of receiving the context in the first state:
   display the first content and the second content on a flexible display area.

4. The electronic device of claim 1, wherein the instructions, when executed by the at least one processor, further cause the electronic device to, in case of receiving the context in the first state:
   display the first content on a flexible display area, and
   display the second content on a part of the flexible display area as a pop-up window.

5. The electronic device of claim 1, wherein the instructions, when executed by the at least one processor, further cause the electronic device to, in case of receiving the context in the first state:
   increase the area where the flexible display is exposed out of the housing,
   display the second content on an increased area.

6. The electronic device of claim 2,
   wherein the at least one processor is further configured to display a notification on a part of the flexible display area in the first state, and
   wherein the notification comprises information guiding the use of the increased area to display the second content.

7. The electronic device of claim 1, wherein the context generated from the external device comprises at least one of a first context comprising information related to settings of the external device, a second context comprising information related to data collected by the external device, or a third context comprising event information generated from an outside that is not related to the application running on the electronic device.

8. The electronic device of claim 7, wherein the instructions, when executed by the at least one processor, further cause the electronic device to, in case of the external device is used to execute the first content:
   determine the first context related to settings of the external device and the second context including information related to data collected from the external device as the second content.

9. The electronic device of claim 7, wherein the instructions, when executed by the at least one processor, further cause the electronic device to, in case of the external device is not used to execute the first content:
   determine the first context related to the setting of the external device as the second content.

10. The electronic device of claim 7, wherein the instructions, when executed by the at least one processor, further cause the electronic device to, in case of detecting an external event that is not related to the first content:
    determine the third context as the second content.

* * * * *